US007189797B2

(12) United States Patent
Minobe et al.

(10) Patent No.: US 7,189,797 B2
(45) Date of Patent: Mar. 13, 2007

(54) PROCESS FOR PRODUCING POLY(ETHYLENE-AROMATIC DICARBOXYLATE ESTER) RESIN AND RESIN PRODUCT

(75) Inventors: Nobuo Minobe, Matsuyama (JP); Ryoji Tsukamoto, Matsuyama (JP); Tomoyoshi Yamamoto, Matsuyama (JP); Tomoyuki Kishino, Matsuyama (JP); Kenichi Ishihara, Matsuyama (JP)

(73) Assignee: Teijin Limited, Osaka (JP)

( * ) Notice: Subject to any disclaimer, the term of this patent is extended or adjusted under 35 U.S.C. 154(b) by 99 days.

(21) Appl. No.: 10/488,946

(22) PCT Filed: Sep. 18, 2002

(86) PCT No.: PCT/JP02/09582

§ 371 (c)(1),
(2), (4) Date: Mar. 9, 2004

(87) PCT Pub. No.: WO03/027166

PCT Pub. Date: Apr. 3, 2003

(65) Prior Publication Data
US 2004/0254331 A1 Dec. 16, 2004

(30) Foreign Application Priority Data

| Sep. 20, 2001 | (JP) | ............................ 2001-286766 |
| Oct. 10, 2001 | (JP) | ............................ 2001-312387 |
| Oct. 11, 2001 | (JP) | ............................ 2001-313756 |
| Nov. 28, 2001 | (JP) | ............................ 2001-362327 |
| May 28, 2002 | (JP) | ............................ 2002-153571 |
| Jul. 15, 2002 | (JP) | ............................ 2002-205375 |
| Jul. 19, 2002 | (JP) | ............................ 2002-210859 |
| Aug. 8, 2002 | (JP) | ............................ 2002-231164 |

(51) Int. Cl.
C08G 63/02 (2006.01)

(52) U.S. Cl. .................... 528/272; 428/34.9; 428/35.7; 428/364; 524/706; 524/710; 524/711; 524/713; 528/279; 528/286; 528/287; 528/302; 528/308; 528/308.6

(58) Field of Classification Search ............... 428/34.9, 428/35.7, 364; 524/706, 710, 711, 713; 528/279, 528/286, 287, 302, 308, 308.6, 272
See application file for complete search history.

(56) References Cited

U.S. PATENT DOCUMENTS

| 4,208,527 A | 6/1980 | Horlbeck et al. |
| 4,254,018 A | 3/1981 | Kowallik et al. |
| 5,565,522 A | 10/1996 | Böhringer et al. |
| 5,744,572 A | 4/1998 | Schumann et al. |
| 5,981,690 A | 11/1999 | Lustig et al. |
| 6,262,220 B1 | 7/2001 | Paschke et al. |

FOREIGN PATENT DOCUMENTS

| CN | 1078274 A | | 11/1993 |
| CN | 1302923 A | | 7/2001 |
| EP | 1 094 137 A1 | | 4/2001 |
| EP | 1 110 988 A1 | | 6/2001 |
| EP | 1110988 | * | 6/2001 |
| EP | 1 273 610 A1 | | 1/2003 |
| GB | 769220 | | 3/1957 |
| GB | 769220 | * | 6/1957 |
| JP | 47-26597 B | | 7/1972 |
| JP | 48-2229 B | | 1/1973 |
| JP | 54-45397 A | | 4/1979 |
| JP | 58-38722 A | | 3/1983 |
| JP | 59-46258 B | | 11/1984 |
| JP | 2000-319370 A | | 11/2000 |
| WO | WO 96/19520 | * | 6/1996 |
| WO | WO 96/19520 A1 | | 6/1996 |
| WO | WO 99/28033 A1 | | 6/1999 |
| WO | WO 02/068497 A1 | | 9/2002 |
| WO | WO 02/070451 A1 | | 9/2002 |

OTHER PUBLICATIONS

DATABASE WPI, Section Ch, Week 200126, Derwent Publications Ltd., London, GB; AN 2001-247935.
DATABASE WPI, Section Ch, Week 198742, Derwent Publications Ltd., London, GB; AN 1987-294861.
DATABASE WPI, Section Ch, Week 199429, Derwent Publications Ltd., London, GB; AN 1994-238136.
DATABASE WPI, Section Ch, Week 199419, Derwent Publications Ltd., London, GB; AN 1994-156722.

* cited by examiner

*Primary Examiner*—Terressa Boykin
(74) *Attorney, Agent, or Firm*—Sughrue Mion, PLLC

(57) ABSTRACT

A poly(ethylene aromatic dicarboxylate ester) resin usable for the production of fibers, films and bottle-formed articles, is produced by polycondensing a diester of an aromatic dicarboxylic acid with ethylene glycol by using a catalyst including a non-reacted mixture or reaction product of a titanium compound component including at least one member selected from titanium alkoxides and reaction products of the titanium alkoxides with aromatic polyvalent carboxylic acids or anhydrides thereof, with a specific phosphorus compound, in which catalyst the contents of titanium and phosphorus elements are controlled.

25 Claims, No Drawings

PROCESS FOR PRODUCING POLY(ETHYLENE-AROMATIC DICARBOXYLATE ESTER) RESIN AND RESIN PRODUCT

TECHNICAL FIELD

The present invention relates to a process for producing a poly(ethylene aromatic carboxylate ester) resin using a polycondensation catalyst obtained from a titanium compound and a phosphorus compound, the resin obtained by the process, and products thereof. More specifically, the present invention relates to a process for producing a poly(ethylene aromatic carboxylate ester) resin, which has excellent transparency, excellent color tone and excellent melt stability, without forming foreign matters (or with forming less foreign matters) originating from a polycondensation catalyst in the production process using a polycondensation catalyst obtained from a titanium compound and a phosphorus compound, a resin obtained thereby, and formed products thereof, for example, fibers, film and bottle-formed article.

BACKGROUND ART

Poly(ethylene aromatic carboxylate ester) resins such as polyethylene terephthalate, polyethylene naphthalate, polytrimethylene terephthalate and polytetramethylene terephthalate (which will be referred to as polyester resins hereinafter) have excellent mechanical properties, excellent heat resistance, excellent electric insulating properties and excellent chemical resistance and are widely used as materials for forming shaped articles such as fibers and bottle-formed articles in which the above-mentioned properties are utilized.

As the process for producing polyethylene terephthalate, for example, there is known a process of directly esterifying terephthalic acid with ethylene glycol, or transesterifying a lower alkylester of terephthalic acid, such as dimethyl terephthalate with ethylene glycol, or reacting terephthalic acid with ethylene oxide to form an ethylene glycol ester of terephthalic acid and/or a polymer having a low polymerization degree and polycondensing the reaction product with heating under reduced pressure until a predetermined polymerization degree is attained.

In the production of the polyester resin such as polyethylene terephthalate, generally a polycondensation catalyst is used in order to allow the polymerization reaction to smoothly proceed. The rate of the polycondensation reaction and the quality of the resulting polymer are drastically influenced according to the kind of the polycondensation catalyst. Various metal compounds are known as the polycondensation catalyst. Among these metal compounds, an antimony (Sb) compound such as antimony trioxide is widely used because it is cheap and has a high polymerization activity and also the resulting polymer has comparatively good color tone. However, when the Sb compound is used as the polymerization catalyst, a portion thereof is reduced during the polycondensation reaction to form metallic Sb or other foreign matters, and thus causing a problem in that the resulting polymer is darkened and/or the production process is made unstable, resulting in deterioration of the quality of the formed article produced from the resulting resin.

When the Sb compound is used as a polycondensation catalyst for polyester and the resulting polyester resin is continuously melt-spun for a long time, foreign matters (which may be referred to as spinneret foreign matters, hereinafter) are deposited and accumulated around spinning orifices and a bending phenomenon arises in molten polymer streams, and thus causing a problem in that the filaments are fuzzed and/or filament yarn breakages occur in the resulting filament yarn during the spinning and drawing steps.

As the polycondensation catalyst other than the antimony compound, a germanium compound and a titanium compound such as tetra-n-butoxytitanium are proposed. The germanium compound is considerably expensive and, therefore, there is a problem that a cost in the production of the polyester becomes higher. When using the titanium compound as the polycondensation catalyst, a phenomenon of the deposition of foreign matters around spinning orifices is suppressed during the melt spinning of the resulting polyester resin. However, in this case, there arises such a known problem peculiar to the titanium compound that the resulting polyester itself is colored yellow and/or the melt of the resulting polyester resin has poor thermal stability.

To solve the coloration problem of the polyester resin, which originates from the polymerization catalyst, yellowish coloration is generally suppressed by adding a cobalt compound to the polyester. Although the color tone (color value b) of the polyester can be certainly improved by the addition of the cobalt compound, there arises a known problem that the melt thermal stability of the polyester is further lowered by the addition of the cobalt compound, and thus accelerating the decomposition of the polymer.

Japanese Examined Patent Publication (Kokoku) No. 48-2229 discloses titanium hydroxide as the other titanium compound used in the polycondensation catalyst of the polyester resin, while Japanese Examined Patent Publication (Kokoku) No. 47-26597 discloses to use α-titanic acid as a catalyst for production of a polyester. However, in the former method, titanium hydroxide is not easily powderized, while in the later method, α-titanic acid is easily changed in properties, and, therefore, it is not easy to store and handle. Therefore, these processes are not suited for use in an industrial field and it is also difficult to obtain a good color tone (color value b).

Furthermore, Japanese Examined Patent Publication (Kokoku) No. 59-46258 discloses to use a product obtained by reacting a titanium compound with trimellitic acid as a polycondensation catalyst for production of a polyester, and Japanese Unexamined Patent Publication (Kokai) No. 58-38722 discloses to use a product obtained by reacting a titanium compound with a phosphite ester as a polycondensation catalyst for production of a polyester. Although the thermal stability of the melt of the polyester is improved to some extent by using these polymerization catalysts, the resulting polymer has poor color tone (color value b) and thus a further improvement in color tone (color value b) of the polyester is required. It is an effective means to use no antimony as the catalyst in order to suppress the deposition of spinneret foreign matters. However, according to the process using no antimony, the resulting polyester resin and polyester resin product, particularly polyester fibers, have unsatisfactory color tone. Therefore, it has conventionally been difficult to put a catalyst free from antimony into practice.

Furthermore, there is known a process of regenerating a polyester resin using, as a raw material, an aromatic dicarboxylate ester obtained by recovering used polyester products (for example, fibers, films and bottles), followed by washing, grinding and further depolymerization. In this case, it is also required to develop a process for producing a regenerated polyester having good transparency and good color tone.

DISCLOSURE OF THE INVENTION

An object of the present invention is to provide a process for efficiently producing a poly(ethylene aromatic carboxylate ester) resin, which contains impurities in a decreased amount and has excellent transparency, high thermal stability of the melt and good color tone, a poly(ethylene aromatic carboxylate ester) resin obtained thereby, and various formed products obtained by using the resin.

The process of the present invention for producing a poly(ethylene aromatic carboxylate ester) resin comprises polycondensing a diester of an aromatic dicarboxylic acid with ethylene glycol in the presence of a catalyst system, wherein the catalyst system comprises at least one member selected from the group consisting of:

non-reacted mixtures and reaction products of (1) a titanium compound component comprising at least one member selected from the group consisting of titanium alkoxides and reaction products of titanium alkoxides with aromatic polyvalent carboxylic acids or anhydrides thereof with (2a) a phosphorus compound component comprising at least one member selected from the compounds represented by the general formula (1):

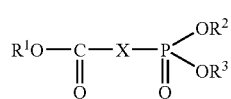

(1)

wherein $R^1$, $R^2$ and $R^3$ respectively and independently from each other represent an alkyl group having 1 to 4 carbon atoms and X represents a —$CH_2$— group or a group represented by the formula (1a):

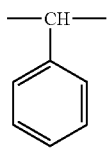

(1a)

and non-reacted mixtures of the above-mentioned titanium compound component (1) with (2b) a phosphorus compound component comprising at least one member selected from the phosphorus compounds represented by the general formulae (2) and (3):

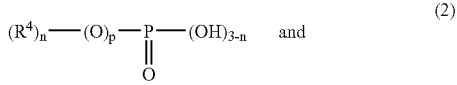

(2)

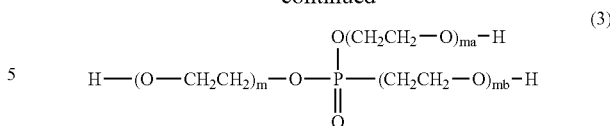

(3)

wherein in the formula (2), $R^4$ represents an alkyl group having 2 to 18 carbon atoms or an aryl group having 6 to 20 carbon atoms, n represents an integer of 1 or 2 and when n represents 1, p represents an integer of 0 or 1 and when n represents 2, p represents zero, and in the formula (3), m, ma and mb respectively and independently from each other represents an integer of 1 or 2, the catalyst system satisfying the requirements (a), (b) and (c):

$2 \leq M_{Ti} \leq 15$ (a)

$1 \leq (M_p/M_{Ti}) \leq 15$ (b)

$10 \leq (M_{Ti}+M_p) \leq 100$ (c)

in which requirements (a), (b) and (c), $M_{Ti}$ represents a ratio of the amount in the units of milli moles of titanium element contained in the catalyst system to the total amount in the units of moles of the repeating ethylene aromatic dicarboxylate ester units in the poly(ethylene aromatic dicarboxylate ester), $M_p$ represents a ratio of the amount of phosphorus element in the units of milli moles contained in the catalyst system to the total amount in the units of moles of the repeating ethylene aromatic dicarboxylate ester units in the poly(ethylene aromatic dicarboxylate ester).

The process of the present invention for producing a poly(ethylene aromatic dicarboxylate ester) resin optionally further comprises producing the diester of the aromatic dicarboxylic acid with ethylene glycol by a diesterification reaction of the aromatic dicarboxylic acid with ethylene glycol.

The process of the present invention for producing a poly(ethylene aromatic dicarboxylate ester) resin optionally further comprises producing the diester of an aromatic dicarboxylic acid with ethylene glycol by a transesterification reaction of a dialkylester of an aromatic dicarboxylic acid with ethylene glycol.

In the process of the present invention for producing a poly(ethylene aromatic dicarboxylate ester) resin, preferably, the transesterification reaction of the dialkylester of the aromatic dicarboxylic acid with ethylene glycol is carried out in the presence of at least the non-reacted or reacted titanium compound component (1); and the resultant reaction mixture from the transesterification reaction and containing the diester of the aromatic dicarboxylic acid with ethylene glycol is subjected to a polycondensation reaction in the presence of a catalyst system comprising, together with at least the non-reacted or reacted titanium compound component (1) contained in the reaction mixture, the non-reacted or reacted phosphorus compound component (2a) or the non-reacted phosphorus compound component (2b).

In the process of the present invention for producing a poly(ethylene aromatic dicarboxylate ester) resin, preferably the aromatic dicarboxylic acid is selected from terephthalic acid, isophthalic acid, naphthalene dicarboxylic acid, 5-sulphoisophthalate metal salt and 5-sulphoisophthalate onium salt.

In the process of the present invention for producing a poly(ethylene aromatic dicarboxylate ester) resin, preferably the dialkylester of the aromatic dicarboxylic acid is selected from dimethyl terephthalate, dimethyl isophthalate dimethyl naphthalate, diethyl terephthalate, diethyl isophthalate and diethyl naphthalate.

In the process of the present invention for producing a poly(ethylene aromatic dicarboxylate ester) resin, the titanium alkoxides for the titanium compound component (1) are preferably selected from the titanium compounds represented by the general formula (4):

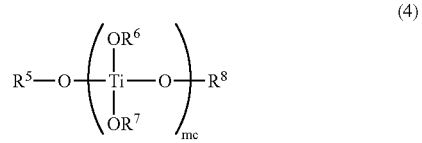

in which formula (4), $R^5$, $R^6$, $R^7$ and $R^8$ respectively and independently from each other represent an alkyl group having 2 to 10 carbon atoms or a phenyl group, and mc represents an integer of 1 to 4.

In the process of the present invention for producing a poly(ethylene aromatic dicarboxylate ester) resin, the aromatic polyvalent carboxylic acids for the titanium compound component (1) are preferably selected from the compounds represented by the general formula (5):

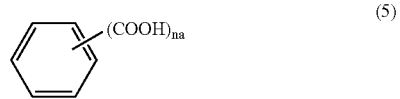

in which formula (5), na represents an integer of 2 to 4.

In the process of the present invention for producing a poly(ethylene aromatic dicarboxylate ester) resin, the transesterification reaction is preferably carried out under a pressure of 0.05 to 0.20 MPa.

In the process of the present invention for producing a poly(ethylene aromatic dicarboxylate ester) resin, the dialkylester of the aromatic dicarboxylic acid to be subjected to the transesterification reaction preferably comprises dimethyl terephthalate in an amount of 80 molar % or more based on the total molar amount of the dialkylester of the aromatic dicarboxylic acid.

In the process of the present invention for producing a poly(ethylene aromatic dicarboxylate ester) resin, the dialkylester of the aromatic dicarboxylic acid to be subjected to the transesterification reaction preferably contains dialkyl terephthalate recovered by depolymerizing polyalkylene terephthalate in an amount of 70 molar % or more based on the total molar amount of the dialkylester of the aromatic dicarboxylic acid.

In the process of the present invention for producing a poly(ethylene aromatic dicarboxylate ester) resin, the recovered dialkyl terephthalate preferably contains 2-hydroxyterephthalic acid in a content controlled to 2 ppm or less.

In the process of the present invention for producing a poly(ethylene aromatic dicarboxylate ester) resin, preferably, the catalyst system comprises a non-reacted mixture of the titanium compound component (1) with the phosphorus compound component (2a) or (2b);

the whole amount of the titanium compound component (1) is added into the reaction system before or at the start of the transesterification; and the whole amount of the phosphorus compound component (2a) or (2b) is added into the resultant reaction system from the transesterification reaction before or at the start of the polycondensation reaction.

In the process of the present invention for producing a poly(ethylene aromatic dicarboxylate ester) resin, preferably, the catalyst system comprises a reaction product of the titanium compound component (1) with the phosphorus compound component (2a);

the whole amount of the catalyst system is added into the reaction system before or at the start of the transesterification reaction; and after the transesterification reaction is completed, the resultant reaction mixture is subjected to the polycondensation reaction.

In the process of the present invention for producing a poly(ethylene aromatic dicarboxylate ester) resin, preferably, before the transesterification reaction, a portion of the titanium compound component (1), or a portion the reaction product of the titanium compound component (1) with the phosphorus compound component (2a), or a portion the phosphorus compound component (2b) is added into the reaction system, and at least one stage during and after the completion of the transesterification reaction and before and during the polycondensation reaction, the remaining portion of the above-mentioned catalyst component is added into the reaction system.

In the process of the present invention for producing a poly(ethylene aromatic dicarboxylate ester) resin, preferably, the whole amount of the phosphorus compound component (2a) is added into the diesterification reaction system before the start of the diesterification reaction, or a portion of the phosphorus compound component (2a) is added into the diesterification reaction system before the start of the reaction, and the remaining portion of the phosphorus compound component (2a) is added, at least one stage during and after the completion of the diesterification reaction and before the start of and during the polycondensation reaction, into the reaction system.

The poly(ethylene aromatic dicarboxylate ester) resin of the present invention is produced by the process for producing a poly(ethylene aromatic dicarboxylate ester) resin, as mentioned above.

The poly(ethylene aromatic dicarboxylate ester) resin of the present invention optionally further comprises an antioxidant hindered phenol compound in a content of 1% by mass or less.

In the process of the present invention for producing a poly(ethylene aromatic dicarboxylate ester) resin, poly(ethylene aromatic dicarboxylate ester) resin preferably contains antimony element and germanium element each in a content controlled to 5/1000 molar % or less.

Polyester fibers of the present invention comprises a poly(ethylene aromatic dicarboxylate ester) resin as mentioned above.

In the polyester fibers of the present invention, the poly (ethylene aromatic dicarboxylate ester) resin preferably comprises, as a principal component, polyethylene terephthalate.

The polyester film of the present invention comprises a poly(ethylene aromatic dicarboxylate ester) resin as mentioned above.

In the polyester film of the present invention the poly (ethylene aromatic dicarboxylate ester) resin preferably comprises, as a principal component, polyethylene terephthalate.

The bottle-formed polyester article of the present invention comprises a poly(ethylene aromatic dicarboxylate aster) resin as mentioned above.

In the bottle-formed polyester article of the present invention the poly(ethylene aromatic dicarboxylate ester) resin preferably comprises, as a principal component, polyethylene terephthalate.

BEST MODE FOR CARRYING OUT THE INVENTION

In the process of the present invention, a poly(ethylene aromatic carboxylate ester) resin is produced by polycondensing a diester of an aromatic dicarboxylic acid with ethylene glycol in the presence of a catalyst system.

The catalyst system used in the process of the present invention comprises at least one member selected from the group consisting of:

non-reacted mixtures and reaction products of (1) a titanium compound component comprising at least one member selected from the group consisting of titanium alkoxides and reaction products of titanium alkoxides with aromatic polyvalent carboxylic acids or anhydrides thereof with (2a) a phosphorus compound component comprising at least one member selected from the compounds represented by the general formula (1):

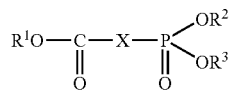  (1)

wherein $R^1$, $R^2$ and $R^3$ respectively and independently from each other represent an alkyl group having 1 to 4 carbon atoms and X represents a —CH$_2$— group or a group represented by the formula (1a):

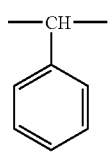  (1a)

and non-reacted mixtures of the above-mentioned titanium compound component (1) with (2b) a phosphorus compound component comprising at least one member selected from the phosphorus compounds represented by the general formulae (2) and (3):

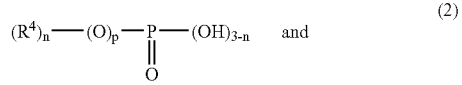  (2)

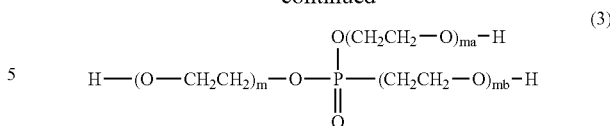  (3)

wherein in the formula (2), $R^4$ represents an alkyl group having 2 to 18 carbon atoms or an aryl group having 6 to 20 carbon atoms, n represents an integer of 1 or 2 and when n represents 1, p represents an integer of 0 or 1 and when n represents 2, p represents zero, and in the formula (3), m, ma and mb respectively and independently from each other represents an integer of 1 or 2.

The contents of the titanium element and phosphorus element contained in the catalyst system used in the process of the present invention are controlled so as to satisfy the requirements (a), (b) and (c):

$2 \leq M_{Ti} \leq 15$  (a)

$1 \leq (M_p/M_{Ti}) \leq 15$  (b)

$10 \leq (M_{Ti}+M_p) \leq 100$  (c)

in which requirements (a), (b) and (c), $M_{Ti}$ represents a ratio of the amount in the units of milli moles of titanium element contained in the catalyst system to the total amount in the units of moles of the repeating ethylene aromatic dicarboxylate ester units in the poly(ethylene aromatic dicarboxylate ester), $M_p$ represents a ratio of the amount of phosphorus element in the units of milli moles contained in the catalyst system to the total amount in the units of moles of the repeating ethylene aromatic dicarboxylate ester units in the poly(ethylene aromatic dicarboxylate ester).

In the formula (a), $M_{Ti}$ is a value corresponding to the total amount of the titanium compound component used in the transesterification reaction and the polycondensation reaction of the process of the present invention. The value of $M_{Ti}$ is preferably 2 or more and 15 or less, more preferably 3 or more and 10 or less, and most preferably 3 or more and 6 or less. When the value of $M_{Ti}$ is less than 2, the production yield of the objective polyester resin becomes insufficient, sometimes, and a molecular weight of the resulting polyester does not reach a desired value, sometimes. On the other hand, when the value of $M_{Ti}$ exceeds 15, the thermal stability of the resulting polyester becomes insufficient and a molecular weight is drastically lowered, sometimes, when this polyester resin is subjected to forming at high temperature, for example, melt spinning, melt film-forming or melt bottle-forming, and thus a formed product having desired mechanical properties can not be obtained.

In the formula (b), the value of $M_{Ti}$ is as described above and is a value corresponding to the total amount of the phosphorus compound component (2a) or (2b) used in the transesterification reaction and the polycondensation reaction in the process of the present invention. A ratio $M_p/M_{Ti}$ is preferably 15 or less, more preferably 2 or more and 15 or less, and most preferably 4 or more and 10 or less. When the ratio $M_p/M_{Ti}$ is less than 1, the resulting polyester resin has an yellowish color tone. On the other hand, when it exceeds 15, the polycondensation activity of the catalyst system is not enough to obtain a polyester of the catalyst system, and thus making it difficult to obtain a polyester having a desired molecular weight. When $M_p/M_{Ti}$ is within a range from 1 to 15, the polymerization activity of the catalyst system to a diester of an aromatic dicarboxylic acid and ethylene glycol of the catalyst system becomes sufficiently high and a polyester resin having a desired molecular weight and a good color tone can be obtained.

Furthermore, in the formula (c), the sum of $M_{Ti}$ and $M_p$, ($M_{Ti}+M_p$), is preferably 10 or more and 100 or less, and more preferably 2 or more and 70 or less. When the value of ($M_{Ti}+M_p$) is less than 10, the uniformity of the quality and the formability of the resulting polyester resin become insufficient and the production yield becomes insufficient when the resulting polyester resin is subjected to film-forming using an electrostatic impression process. Also the resulting film has not a uniform thickness and, therefore, the resulting film has insufficient film-formability and insufficient impact resistance. On the other hand, when the value of ($M_{Ti}+M_p$) exceeds 100, the resulting polyester resin contains foreign matters, which originates from the polymerization catalyst, resulting in insufficient transparency.

The aromatic dicarboxylic acid used in the process of the present invention is preferably selected from terephthalic acid, isophthalic acid, naphthalene dicarboxylic acid, 5-sulphoisophthalate metal salt and 5-sulphoisophthalate onium salt.

The process of the present invention may further comprise the step of producing the diester of the aromatic dicarboxylic acid with ethylene glycol by a diesterification reaction of the aromatic dicarboxylic acid with ethylene glycol.

This diesterification reaction of the aromatic dicarboxylic acid with ethylene glycol may be carried out in the absence of a catalyst or the presence of a catalyst (for example, alkali metal salt or alkali earth metal salt) under the reaction conditions of a pressure of 0.05 to 0.20 MPa and a temperature of 230 to 280° C.

In another embodiment, the process of the present invention may further comprises the step of producing the diester of an aromatic dicarboxylic acid with ethylene glycol by a transesterification reaction of a dialkylester of an aromatic dicarboxylic acid with ethylene glycol.

In this transesterification reaction, transesterification of a dialkylester of an aromatic dicarboxylic acid with ethylene glycol is carried out at a temperature of 160 to 260° C. under a pressure of 0.05 to 0.20 MPa in the presence of a catalyst.

When the pressure during the transesterification reaction is less than 0.05 MPa, the reaction may not be sufficiently promoted by a catalytic action of the titanium compound component (1), sometimes. On the other hand, when the pressure exceeds 0.20 MPa, a large amount of diethylene glycol as by-product may be produced, and thus the resulting polymer may have unsatisfactory properties, for example, an unsatisfactory thermal stability.

In the process of the present invention, when using a dialkylester of an aromatic dicarboxylic acid, an alkyl group preferably has 1 to 5 carbon atoms and, more preferably, methyl group, ethyl group or isopropyl group is used. Preferred dialkylester of the aromatic dicarboxylic acid used in the process of the present invention is preferably selected from dimethyl terephthalate, dimethyl isophthalate dimethyl naphthalate, diethyl terephthalate, diethyl isophthalate and diethyl naphthalate.

In the process of the present invention, the dialkylester of the aromatic dicarboxylic acid to be subjected to the transesterification reaction may comprise dimethyl terephthalate in an amount of 80 molar % or more based on the total molar amount of the dialkylester of the aromatic dicarboxylic acid.

The dialkylester of the aromatic dicarboxylic acid to be subjected to the transesterification reaction may contain dialkyl terephthalate recovered by depolymerizing polyalkylene terephthalate in an amount of 70 molar % or more based on the total molar amount of the dialkylester of the aromatic dicarboxylic acid.

The recovered dialkyl terephthalate preferably contains 2-hydroxyterephthalic acid in a content controlled to 2 ppm or less.

In the process of the present invention, when the diester of the aromatic dicarboxylic acid with ethylene glycol is produced by the transesterification reaction of the aromatic dialkylester with ethylene glycol, this transesterification reaction is usually carried out in the presence of a catalyst. As the catalyst for the transesterification reaction, all or a portion of the catalyst system for polycondensation used in the process of the present invention can be employed.

In the process of the present invention, namely, the transesterification reaction of the dialkylester of the aromatic dicarboxylic acid with ethylene glycol is preferably carried out in the presence of the titanium compound component (1), which is not reacted with at least the phosphorus compound component (2a) or (2b) in the catalyst system or reacted with the phosphorus compound component (2a); and the resultant reaction mixture from the transesterification reaction and containing the diester of the aromatic dicarboxylic acid with ethylene glycol is subjected to a polycondensation reaction in the presence of a catalyst system comprising, together with at least the non-reacted or reacted titanium compound component (1) contained in the reaction mixture, the non-reacted or reacted phosphorus compound component (2a) or the non-reacted phosphorus compound component (2b) to produce a poly(ethylene aromatic dicarboxylate ester) resin.

In the process of the present invention, the titanium compound component (1), which constitutes the catalyst system, comprises at least one member selected from the group consisting of titanium alkoxides and reaction products of titanium alkoxides with aromatic polyvalent carboxylic acids or anhydrides thereof.

In the present invention, the titanium alkoxides used in the titanium compound component (1), which constitutes the catalyst system, are preferably selected from the titanium compounds represented by the general formula (4):

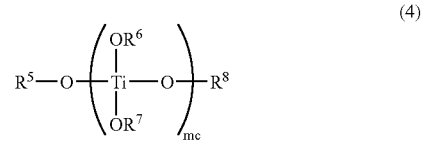

in which formula (4), $R^5$, $R^6$, $R^7$ and $R^8$ respectively and independently from each other represent an alkyl group having 2 to 10 carbon atoms or a phenyl group, and mc represents an integer of 1 to 4. As the titanium alkoxides, for example, tetraisopropoxytitanium, tetrapropoxytitanium, tetra-n-butoxytitanium, tetraethoxytitanium, tetraphenoxytitanium, octaalkyl trititanate and hexaalkyl dititanate are preferably used.

In the process of the present invention, the aromatic polyvalent carboxylic acids used in the titanium compound component (1), which constitutes the catalyst system, are selected from the compounds represented by the general formula (5):

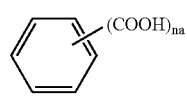

(5)

in which formula (5), na represents an integer of 2 to 4.

The aromatic polyvalent carboxylic acids or anhydrides thereof are preferably selected from phthalic acid, trimellitic acid, hemimellitic acid, pyromellitic acid and anhydrides thereof.

The reaction of the titanium alkoxide with the aromatic polyvalent carboxylic acid (or anhydride thereof) is carried out by mixing the aromatic polyvalent carboxylic acid or anhydride thereof with a solvent, thereby to dissolve all or a portion of the aromatic polyvalent carboxylic acid in the solvent, adding dropwise the titanium alkoxide to the mixed solution and maintaining at a temperature of 0 to 200° C. for 30 or more minutes, and preferably at 30 to 150° C. for 40 to 90 minutes. The reaction pressure is not specifically limited and may be normal pressure. The solvent is selected from those capable of dissolving a portion or all of the aromatic polyvalent carboxylic acid or anhydride thereof, and is preferably selected ethanol, ethylene glycol, trimethylene glycol, tetramethylene glycol, benzene and xylene.

A reaction molar ratio of the titanium alkoxide to the aromatic polyvalent carboxylic acid or anhydride thereof is not specifically limited. However, when the proportion of the titanium alkoxide is too high, the resulting polyester may have poor color tone and a low softening point. On the other hand, when the proportion of the titanium alkoxide is too low, the polycondensation reaction sometimes hardly proceeds. Therefore, the reaction molar ratio of the titanium alkoxide to the aromatic polyvalent carboxylic acid or anhydride thereof is preferably controlled within a range from 2/1 to 2/5. The reaction product obtained by the reaction may be subjected as it is to the reaction with the above-mentioned phosphorus compound component (2a), or the reaction product may be reacted with the phosphorus compound component (2a) after purifying by recrystallization with a solvent comprising acetone, methyl alcohol and/or ethyl acetate.

In an embodiment of the catalyst system used in the process of the present invention, a non-reacted mixture or a reaction product of the titanium compound component (1) with the phosphorus compound component (2a) is used. The phosphorus compound component (2a) contains at least one member selected from the phosphorus compound represented by the general formula (1).

The phosphorus compound (phosphonate compound) represented by the general formula (1) is preferably selected from dimethylesters, diethylesters, dipropylesters and dibutylesters of carbomethoxymethanephosphonic acid, carboethoxymethanephosphonic acid, carbopropoxymethanephosphonic acid, carbobutoxymethanephosphonic acid, carbomethoxy-phosphono-phenylacetic acid, carboethoxy-phosphono-phenylacetic acid, carbopropotoxy-phosphono-phenylacetic acid and carbobutoxy-phosphono-phenylacetic acid.

The phosphorus compound (phosphonate compound) represented by the general formula (1) reacts with the titanium compound component (1), relatively mildly, and thus making it possible to extend the duration of the catalytic activity of the titanium compound during the polycondensation reaction and to reduce the amount of the catalyst system to be added during the polyester polymerization reaction. Even if a large amount of stabilizers is added to the catalyst system containing the phosphorus compound of the formula (1), the thermal stability of the resulting polyester is not lowered and the color tone is not made insufficient.

The reaction product of the titanium compound component (1) with the phosphorus compound component (2a) is produced, for example, by mixing the phosphorus compound component (2a) comprising at least one member selected from the phosphorus compound of the formula (1) with a solvent, thereby to dissolve all or a portion of the phosphorus compound component (2a) in the solvent, adding dropwise the titanium compound component (1) to the mixed solution and maintaining the reaction system at a temperature of 50 to 200° C., preferably at 70 to 150° C., for one minute to 4 hours, preferably 30 minutes to 2 hours. In the reaction, although the reaction pressure is not specifically limited and may be any of pressure (0.1 to 0.5 MPa), the ambient atmospheric pressure and reduced pressure (0.001 to 0.1 MPa), the reaction is usually carried out under the ambient atmospheric pressure.

The solvent for the phosphorus compound component (2a) of the formula (1) used in the reaction for production of the catalyst is not specifically limited as far as it can dissolve at least a portion of the phosphorus compound component (2a). For example, a solvent comprising at least one member selected from ethanol, ethylene glycol, trimethylene glycol, tetramethylene glycol, benzene and xylene is preferably used. Particularly, the same compound as a glycol component, which constitutes the polyester to be finally obtained, is preferably used as the solvent.

In the reaction for production of the catalyst, preferably the ratio of the titanium compound component (1) to the phosphorus compound component (2a) in the reaction system is controlled so that a reaction molar ratio of a molar amount calculated in terms of titanium atom ($m_{Ti}$) of the titanium compound component (1) to a molar amount calculated in terms of phosphorus atom ($m_p$) of the phosphorus compound component (2a), $m_{Ti}/m_p$, is within a range from 1:1 to 1:3, and preferably from 1:1 to 1:2 in the reaction product of the titanium compound component (1) with the phosphorus compound component (2a) contained in the resulting catalyst.

The reaction product of the titanium compound component (1) with the phosphorus compound component (2a) may be used as the catalyst for production of the polyester without purifying after being separating from the reaction system using a means such as centrifugal sedimentation or filtration. Alternatively, the separated reaction product may be used as the catalyst after purifying by recrystallization with a recrystallizing agent, for example, acetone, methyl alcohol and/or water. Also the reaction product-containing reaction mixture may be used as it is as a catalyst-containing mixture without separating the reaction product from the reaction system.

In the catalyst system used in the process of the present invention, the titanium compound component (1) and the phosphorus compound component (2a) may be used as the non-reacted mixture. In this case, a ratio of the titanium compound component (1) to the phosphorus compound component (2a) is controlled so that a ratio of a molar amount calculated in terms of titanium atom ($m_{Ti}$) of the titanium compound component (1) to a molar amount calculated in terms of phosphorus atom ($m_p$) of the phosphorus compound component (2a), $m_{Ti}/m_p$, is within a range from 1:1 to 1:15, and more preferably from 1:2 to 1:10.

In another aspect of the catalyst used in the process of the present invention, the titanium compound component (1) is used after mixing with the phosphorus compound component (2b) comprising at least one member selected from the phosphorus compounds represented by the general formula (2) or (3).

Specific examples of the phosphorus compounds represented by the general formula (2) include phenylphosphonic acid, methylphosphonic acid, ethylphosphonic acid, propylphosphonic acid, isopropylphosphonic acid, butylphosphonic acid, tolylphosphonic acid, xylylphosphonic acid, biphenylphosphonic acid, naphthylphosphonic acid, anthrylphosphonic acid, 2-carboxyphenylphosphonic acid, 3-carboxyphenylphosphonic acid, 4-carboxyphenylphosphonic acid, 2,3-dicarboxyphenylphosphonic acid, 2,4-dicarboxyphenyl phosphonic acid, 2,5-dicarboxyphenyl phosphonic acid, 2,6-dicarboxyphenyl phosphonic acid, 3,4-dicarboxyphenyl phosphonic acid, 3,5-dicarboxyphenyl phosphonic acid, 2,3,4-tricarboxyphenyl phosphonic acid, 2,3,5-tricarboxyphenyl phosphonic acid, 2,3,6-tricarboxyphenyl phosphonic acid, 2,4,5-tricarboxyphenyl phosphonic acid and 2,4,6-tricarboxyphenyl phosphonic acid in case p represents 0. Among these compounds, monoarylphosphonic acid is preferred.

Specific examples of the other phosphorus compounds represented by the general formula (2) include monomethyl phosphate, monoethyl phosphate, monotrimethyl phosphate, mono-n-butyl phosphate, monohexyl phosphate, monoheptyl phosphate, monononyl phosphate, monodecyl phosphate, monodoedcyl phosphate, monophenyl phosphate, monobenzyl phosphate, mono(4-dodecyl)phenyl phosphate, mono(4-methyl)phenyl phosphate, mono(4-ethyl)phenyl phosphate, mono(4-propyl)phenyl phosphate, mono(4-dodecylphenyl) phosphate, monotolyl phosphate, monoxylyl phosphate, monobiphenyl phosphate, mononaphthyl phosphate and monoanthryl phosphate in case p represents 1.

Specific examples of the phosphorus compound of the geenral formula (3) include tri(hydroxyethoxy) phosphate and tri(hydroxyethoxyethoxy) phosphate.

In the catalyst system used in the process of the present invention, the titanium compound component (1) and the phosphorus compound component (2b) may be used in a non-reacted mixture thereof. In this case, the mixing of the titanium compound component (1) to the phosphorus compound component (2b) is preferably controlled so that the ratio of a molar amount calculated in terms of titanium atom ($m_{Ti}$) of the titanium compound component to a molar amount calculated in terms of phosphorus atom ($m_p$) of the phosphorus compound component, $m_{Ti}/m_p$, is within a range from 1:1 to 1:15, and more preferably from 1:2 to 1:10.

Even if the phosphorus compound components (2a) and (2b) containing the phosphorus compounds of the general formulae (1), (2) and (3) coexist as a reaction product or non-reacted mixture with the titanium compound component (1) in the transesterification reaction of the dialkylester of the aromatic dicarboxylic acid with ethylene glycol, they do not exert an adverse influence on the transesterification reaction and also exhibit a strong catalytic activity, together with the titanium compound component (1), in the polycondensation reaction of the diester of the aromatic dicarboxylic acid with ethylene glycol.

In the process for producing the polyester of the present invention, a polymerization starting material comprising the diester of the aromatic dicarboxylic acid with ethylene glycol (or may be a low polymer (oligomer) thereof) is polycondensed in the presence of the catalyst.

The polycondensation reaction is preferably carried out at a temperature of 230 to 320° C. under normal pressure or reduced pressure, preferably 0.05 Pa to 0.2 MPa, or under the combined conditions for 15 to 300 minutes.

In the process of the present invention, in case the catalyst system comprises a non-reacted mixture of the titanium compound component (1) with the phosphorus compound component (2a) or (2b), optionally, the whole amount of the titanium compound component (1) is added into the reaction system before or at the start of the transesterification, and the whole amount of the phosphorus compound component (2a) or (2b) is added into the resultant reaction system from the transesterification reaction before or at the start of the polycondensation reaction.

In case the catalyst system comprises a reaction product of the titanium compound component (1) with the phosphorus compound component (2a), optionally, the whole amount of the catalyst system is added into the reaction system before or at the start of the transesterification reaction and after the transesterification reaction is completed, the resultant reaction mixture is subjected to the polycondensation reaction.

In the process of the present invention, in case the diester of the aromatic dicarboxylic acid with ethylene glycol is produced by the transesterification reaction, optionally, before the transesterification reaction, a portion of the titanium compound component (1), or a portion the reaction product of the titanium compound component (1) with the phosphorus compound component (2a), or a portion the phosphorus compound component (2a) is added into the reaction system, and at least one stage during and after the completion of the transesterification reaction and before and during the polycondensation reaction, the remaining portion of the above-mentioned catalyst component is added into the reaction system.

In the process of the present invention, in case the diester of the aromatic dicarboxylic acid with ethylene glycol is produced by the diesterification reaction, optionally, the whole amount of the phosphorus compound component (2a) is added into the diesterification reaction system before the start of the diesterification reaction, or a portion of the phosphorus compound component (2a) is added into the diesterification reaction system before the start of the reaction, and the remaining portion of the phosphorus compound component (2a) is added, at least one stage during and after the completion of the diesterification reaction and before the start of and during the polycondensation reaction, into the reaction system.

According to the process of the present invention as mentioned above, a poly(ethylene aromatic carboxylate ester) resin having a good color tone is obtained without forming foreign matters (or with forming less foreign matters) which originate from the catalyst system used.

If necessary, reaction stabilizers such as trimethyl phosphate may be added into the polyester resin of the present invention in any stage during the production of the polyester resin and, if necessary, one or more members selected from additives such as antioxidants, ultraviolet absorbers, flame retardants, fluorescent whitening agents, matting agents, color-regulating agents, defoaming agents and the like. It is particularly preferred that the polyester contains an antioxidant containing at least one member selected from hindered phenol compounds, and the content is preferably 1% by mass or less based on the mass of the polyester. When the content exceeds 1% by mass, there sometimes arises a problem in that thermal deterioration of the antioxidant itself causes the quality of the resulting product to be degraded. The hindered phenol compound for antioxidant used in the present invention can be selected from pentaerythritol-tetrakis[3-(3,5-di-tert-butyl-4-hydroxyphenyl)propionate, 3,9-bis{2-[3-(3-tert-butyl-4-hydroxy-5-methylphenyl)propionyloxy]-1,1-dimethylethyl}-2,4,8,10-tetraoxaspiro[5,5] undecane, 1,1,3-tris(2-methyl-4-hdyroxy-5-tert-butylphenyl)butane, 1,3,5-trimethyl-2,4,6-tris(3,5-di-tert-butyl-4-hydroxybenzyl)benzene, 1,3,5-tris-(4-tert-butyl-3-hydroxy-2,6-dimethylbenzene)isophthalic acid, triethyl glycol-bis[3-(3-tert-butyl-5-methyl-4-hydroxyphenyl)propionate, 1,6-hexanediol-bis[3-(3,5-di-tert-butyl-4-hdyroxyphenyl)propionate],2,2-thio-diethylene-bis[3-(3,5-di-tert-butyl-4-hydroxyphenyl)propionate] and octadecyl[3-(3,5-di-tert-butyl-4-hydroxyphenyl)propionate]. These hindered phenol antioxidants are preferably used in combination with thioether secondary antioxidants.

Although the method of adding the hindered phenol antioxidant into the polyester is not specifically limited, the hindered phenol antioxidant is preferably added in any stage during or after the completion of the transesterification reaction and before the completion of the polycondensation reaction.

To finely control the color tone of the resulting polyester, color-regulating agents comprising one or more members selected from organic and inorganic blue pigments such as azo, triphenylmethane, quinoline, anthraquinone and phthalocyanine pigments can be added into the reaction system in the stage of producing the polyester. In the process of the present invention, as a matter of course, it is not necessary to use an inorganic blue pigment containing Co, which lowers the melt thermal stability of the polyester, as the color-regulating agent. Therefore, the polyester obtained by the process of the present invention is substantially free from cobalt.

In the polyester obtained by the process of the present invention, the value L obtained by a Hunter type calorimeter is usually 80.0 or more and the value b is usually within a range from −2.0 to 5.0. When the value L of the polyester is less than 80.0, a high whiteness formed article, which can be put into practice, can not be obtained sometimes because the resulting polyester has poor whiteness. When the value b is less than −2.0, the resulting polyester has less yellowish tint, but a bluish tint increases. On the other hand, when the value b exceeds 5.0, the resulting polyester can not be used in the production of a practically useful formed article, sometimes, because of strong yellowish tint. The value L of the polyester obtained by the process of the present invention is preferably 82 or more, and particularly preferably 83 or more, while the value b is preferably within a range from −1.0 to 4.5, and particularly preferably from 0.0 to 0.4.

The value L and the value b of the polyester obtained by the process of the present invention are measured by the following procedure. That is, a polyester sample is melted at 290° C. under vacuum for 10 minutes and formed into a plate having a thickness of 3.0±1.0 mm on an aluminum plate. The polyester specimen is immediately quenched in ice water, dried at 160° C. for one hour, subjected to a crystallization treatment and then placed on a white standard plate for adjusting a colorimeter. The color tone of the surface of the plate-like specimen on the standard plate is measured by using a calorimeter, for example, Hunter type color difference meter, CR-200 manufactured by Minolta Co., Ltd.

The intrinsic viscosity of the polyester in the present invention is not specifically limited, but is preferably within a range from 0.50 to 1.0. When the intrinsic viscosity is within the above range, melt forming can be easily carried out and the resulting formed article has a high strength. The intrinsic viscosity is more preferably within a range from 0.52 to 0.9, and particularly preferably from 0.05 to 0.8.

The intrinsic viscosity of the polyester is measured at a temperature of 35° C. after dissolving the polyester to be tested in ortho-chlorophenol.

The polyester produced by solid phase polycondensation is generally used in the production of bottles, and therefore, it is preferred that the content of cyclic trimer of an ester of the aromatic dicarboxylic acid with ethylene glycol contained in the polyester and having an intrinsic viscosity of 0.70 to 0.90 is 0.5% by weight or less, and the content of acetaldehyde in the polyester is 5 ppm or less.

The poly(ethylene aromatic dicarboxylate ester) resin produced by the process of the present invention preferably contains antimony element and germanium element, as impurities, each in a content controlled to $5/1000$ molar % or less, and more preferably $2/1000$ molar % or less.

When the content of antimony element and germanium element in the polyester exceeds $5/1000$ molar %, the resulting polyester may have a dark blackish color peculiar to antimony element and incorporation of germanium element causes a problem such as increase in manufacturing cost of the resulting polyester.

As described above, the content of antimony element and germanium element in the poly(ethylene aromatic dicarboxylate ester) resin is controlled to $5/1000$ molar % or less by controlling the content of antimony element and germanium element in the diester of the aromatic dicarboxylic acid with ethylene glycol to be subjected to the polycondensation reaction.

Polyester fibers can be produced from the poly(ethylene aromatic dicarboxylate ester) resin of the present invention.

In this case, the poly(ethylene aromatic dicarboxylate ester) resin preferably comprises, as a principal component, polyethylene terephthalate.

A polyester film can be produced from the poly(ethylene aromatic dicarboxylate ester) resin of the present invention.

In this case, the poly(ethylene aromatic dicarboxylate ester) resin preferably comprises, as a principal component, polyethylene terephthalate.

A bottle-formed polyester article can be produced from the poly(ethylene aromatic dicarboxylate ester) resin of the present invention.

In this case, the poly(ethylene aromatic dicarboxylate ester) resin preferably comprises, as a principal component, polyethylene terephthalate.

In an embodiment (1) of the process of the present invention, a polyethylene terephthalate resin is produced by using an ester of an aromatic dicarboxylic acid with ethylene glycol, which preferably contains, as a polycondensation material, ethylene terephthalate in an amount of 80 molar % or more, more preferably 85 molar % or more, and limiting each content of the antimony element and germanium element to $5/1000$ molar % or less, while using the catalyst system and controlling the catalyst system so as to meet the above requirements (a), (b) and (c). In this embodiment (1), when the ester of the aromatic dicarboxylic acid with ethylene glycol is produced by the transesterification reaction, it is controlled that dimethyl terephthalate accounts for 80 molar % or more of the alkylester of the aromatic dicarboxylic acid. In this transesterification reaction, a portion or all of the titanium compound component (1) of the catalyst system used in the process of the present invention is added to the transesterification reaction system and the transesterification reaction is carried out under a pressure of 0.05 to 0.20 MPa and the resulting ester of the aromatic dicarboxylic acid with ethylene glycol is subjected to the polycondensation reaction.

The polyethylene terephthalate resin obtained in the embodiment (1) preferably contains an ethylene terephthalate resin in an amount of 80 molar % or more, more preferably 85 molar % or more, and may be mixed with other resins other than the ethylene terephthalate resin. The polyethylene terephthalate resin means a polyester having an ethylene terephthalate structure as a principal repeating unit. As used herein, the principal repeating units contain ethylene terephthalate units in an amount of 80 molar % or more, more preferably 85 molar % or more, of the whole repeating units. In case where the polyethylene terephthalate resin is obtained by copolymerizing a third component other than the ethylene terephthalate component, there can be used, the third component (copolymerization component) may be selected from aromatic dicarboxylic acid other than terephthalic acid, such as 2,6-naphthalenedicarboxylic acid, isophthalic acid or phthalic acid; aliphatic dicarboxylic acid such as adipic acid, azelaic acid, sebacic acid or decanedicarboxylic acid; and alicyclic dicarboxylic acid such as cyclohexanedicarboxylic acid.

The polyester resin of the embodiment (1) preferably has an intrinsic viscosity (o-chlorophenol, 35° C.) within a range from 0.50 to 0.80, more preferably from 0.55 to 0.75, and particularly preferably from 0.60 to 0.70.

In case the polyethylene terephthalate resin of the embodiment (1) is used to form a film, it may contain, as a lubricant, inert particles having an average particle diameter of 0.05 to 5.0 µm in an amount of about 0.05 to 5.0% by weight, for the purpose of improving the handling property. For the purpose of maintaining high transparency as a feature of the polyethylene terephthalate resin of the present invention, the particle size of the inert particle is preferably as small as possible and the amount of the inert particles is preferably as small as possible. The examples of the inert particles used as the lubricant include colloidal silica, porous silica, titanium oxide, calcium carbonate, calcium phosphate, barium sulfate, alumina, zirconia, kaolin, complex oxide particles, crosslinked polystyrene, crosslinked acrylic resin particles, crosslinked methacrylic resin particles and silicone particles. In case where the polyethylene terephthalate resin is used in various formed articles, for example, films, fibers and bottles, if necessary, it may contain various functional agents, for example, antioxidants, thermal stabilizers, viscosity modifiers, plasticizers, color hue modifiers, nucleating agents and ultraviolet absorbers.

In an embodiment (2) of the present invention, a diester of terephthalic acid with ethylene glycol is produced by the transesterification reaction (pressure: 0.05 to 0.20 MPa) of an dialkylester of terephthalic acid, preferably dimethyl terephthalate, with ethylene glycol using a catalyst system comprising non-reacted mixtures or reaction products of the titanium compound component (1) with the phosphorus compound component (2a) and, furthermore, the diester is polycondensed to produce a polyethylene terephthalate resin. At this time, the composition of the catalyst system is controlled so as to meet the constituent elements (a), (b) and (c). Polyester fibers are produced from the polyethylene terephthalate resin.

The polyester resin preferably has an intrinsic viscosity within a range from 0.40 to 0.80, more preferably from 0.45 to 0.75, and particularly preferably from 0.50 to 0.70. The intrinsic viscosity of less than 0.40 is not preferred because the resulting fibers may have an insufficient strength. On the other hand, when the intrinsic viscosity exceeds 0.80, the intrinsic viscosity of a raw polymer may be excessively high and it may be uneconomical.

In the embodiment (2) of the process of the present invention, the process for producing polyester fibers is not specifically limited and a conventionally known process for melt-spinning a polyester can be used. For example, it is preferred that a polyester is melted at a temperature within a range from 270 to 300° C. and the molten polyester is spun while controlling a melt spinning rate within a range from 400 to 5000 m/min. When the spinning rate is within the above range, the resulting fibers have sufficient strength and can be wound up under stable conditions. The stretched yarn can be produced or by continuously stretching the polyester fibers after winding up the fibers or without winding up the fiber. Furthermore, the polyester fibers of the present invention may be subjected to a weight reduction treatment with alkali to cause the softness of the fibers to increase.

In the production of the polyester fibers, the shape of spinning orifices of the spinneret is not specifically limited and may be a circular or non-circular, or a spinning orifice for hollow fibers may be used.

In an embodiment (3) of the present invention, a diester of an aromatic dicarboxylic acid such as terephthalic acid with ethylene glycol, or an oligomer of the diester is produced, for example, by the esterification reaction of high purity terephthalic acid with ethylene glycol, and then the diester or an oligomer thereof is subjected to the polycondensation reaction. In this polycondensation, the diester or oligomer is polycondensed in the presence of a polycondensation catalyst system comprising a reaction product of a titanium compound component comprising a titanium alkoxide represented by the general formula (4) with a phosphorus compound component comprising a phosphorus compound represented by the general formula (1) in a glycol solvent, to produce a poly(ethylene aromatic dicarboxylate ester) resin. The resulting a poly(ethylene aromatic dicarboxylate ester) resin is subjected to a film-forming step to produce a polyester film.

In the embodiment (3), a molar ratio of phosphorus atoms to titanium atoms, which are contained in the catalyst system, is preferably 1.0 or more and less than 8.0, and more preferably 2.0 or more and less than 7.0.

When the reaction product is contaminated with the non-reacted titanium compound component (1), the resulting polyester resin may have unsatisfactory color tone. When the reaction product is contaminated with the non-reacted phosphorus compound component (2a), the polycondensation reaction of the ester of terephthalic acid with ethylene glycol may be inhibited.

The reaction of the titanium compound component (1) with the phosphorus compound component (2a) proceeds by mixing the titanium compound component (1) with the phosphorus compound component (2a) and heating the mixture. The reaction product usually exists in a solution state. To allow the reaction to proceed uniformly, it is preferred to use a process in which a glycol solvent solution of the titanium compound component (1) and a glycol solvent solution of the phosphorus compound component (2a) are prepared respectively and the mixture is heated. When the reaction temperature is room temperature, there arises a problem that the reaction proceeds insufficiently and the reaction requires excessive long time. Therefore, in order to uniformly and efficiently obtain a reaction product, the reaction is preferably carried out at a temperature within a range from 50 to 200° C. and the reaction time is preferably within a range from 1 minute to 4 hours. When using ethylene glycol as a glycol, the reaction temperature is preferably within a range from 50 to 150° C. and, when using hexamethylene glycol as a glycol, the reaction temperature is preferably within a range from 100 to 200° C. The reaction time is preferably within a range from 30 minutes to 2 hours in these cases.

The catalyst system used in the embodiment (3) preferably meet the above-mentioned requirements (a), (b) and (c).

In the embodiment (3), a polyester film can be produced by melt-extruding a poly(ethylene aromatic dicarboxylate ester) resin and quenching the extruded resin melt stream to form an undrawn film, and biaxially drawing the undrawn film. After drawing, the resulting polyester film may be subjected to a heat set treatment or a relaxing heat treatment, if necessary.

As the aromatic dicarboxylic acid, for example, there can be used terephthalic acid, phthalic acid, isophthalic acid, naphthalenedicarboxylic acid, diphenyldicarboxylic acid, diphenoxyethanedicarboxylic acid, or ester-forming derivatives thereof.

Also it is possible to use a small amount of an aliphatic dicarboxylic acid such as adipic acid, sebacic acid, azelaic acid or decanedicarboxylic acid, and an alicyclic dicarboxylic acid such as cyclohexanedicarboxylic acid may be used in combination with the aromatic dicarboxylic acid. Also, ester-forming derivatives of the above-mentioned compounds may be used. Further, it is possible to use a small amount (10 molar % or less) of an alicyclic glycol such as trimethylene glycol, propylene glycol, tetramethylene glycol, neopentyl glycol, hexamethylene glycol, dodecamethylene glycol or cyclohexane dimethanol, and an aromatic diol such as bisphenol, hydroquinone or 2,2-bis(4-β-hydroxyethoxyphenyl)propanes in combination with ethylene glycol.

Furthermore, a small amount (1 molar % or less) of a polyfunctional compound such as trimesic acid, trimethylolethane, trimethylolpropane, trimethylolmethane or pentaerythritol may be used in combination with the aromatic dicarboxylic acid.

In the embodiment (3), the polyester constituting the polyester film is preferably polyethylene terephthalate wherein terephthalic acid or an ester-forming derivative thereof is used in an amount of 80 molar % or more, preferably 90 molar % or more, based on 100 molar % of the aromatic dicarboxylic acid, while ethylene glycol or an ester-forming derivative thereof is used in an amount of 80 molar % or more, preferably 90 molar % or more, based on 100 molar % of the aliphatic glycol. Particularly preferred is polyethylene terephthalate produced through the esterification reaction so that terephthalic acid accounts for 80 molar % of entire dicarboxylic acid component used as a raw material. In comparison with polyethylene terephthalate produced by using dimethyl terephthalate as a starting compound polyethylene terephthalate produced by using terephthalic acid as a starting compound does not need a transesterification reaction catalyst and a stabilizer to be added to deactivate the transesterification reaction catalyst. As a result, there is the advantage that an interaction between the phosphorus compound added as the stabilizer and the titanium compound is suppressed and the amount of the titanium compound can be reduced.

The process for producing a polyester through the esterification reaction will now be described in detail.

(Esterification Procedure)

First, upon production of the polyester, an aromatic dicarboxylic acid is esterified with an aliphatic glycol. For example, a slurry containing the aromatic dicarboxylic acid and the aliphatic glycol is prepared. The slurry usually contains 1.1 to 1.6 moles, preferably 1.2 to 1.4 moles, of the aliphatic glycol per mole of the aromatic dicarboxylic acid. The slurry is continuously fed to an esterification reaction procedure.

The esterification reaction is preferably carried out by a procedure which is carried out in a single stage while self-circulating a reaction mixture, or a procedure which is carried out by combining two or more esterification reactors with each other in series. In both cases, the reaction is carried out while removing water produced during the reaction out of the system using a rectifying column under the conditions where an aliphatic glycol is refluxed.

In case the esterification is continuously carried out in a single stage while self-circulating the reaction mixture the reaction is usually carried out at the reaction temperature within a range from 240 to 280° C., preferably from 250 to 270° C., under the reaction pressure within a range from the ambient atmospheric pressure to 0.3 MPa. The reaction is preferably carried out until the esterification degree reaches 90% or more, and preferably 95% or more.

By this esterification procedure, an esterification reaction product (oligomer) of the aromatic dicarboxylic acid with the aliphatic glycol is obtained and the polymerization degree of this oligomer is preferably within a range from 4 to 10. The oligomer thus obtained is fed to the following polycondensation step.

(Polycondensation Procedure)

In the polycondensation procedure, the oligomer obtained in the esterification procedure is polycondensed by heating to a temperature higher than a melting point of the polyester (usually from 240 to 280° C.) in the presence of the above-mentioned polycondensation catalyst. The polycondensation reaction is preferably carried out while distilling off the non-reacted aliphatic glycol and the aliphatic glycol produced during the polycondensation reaction out of the reaction system.

The polycondensation reaction may be carried out in a single reaction vessel, or may be separately carried out in plural reaction vessels. In case the polycondensation reaction is carried out in two stages, the polycondensation reaction in the first vessel is carried out under the conditions of the reaction temperature within a range from 245 to 290° C., preferably from 260 to 280° C., and the reaction pressure within a range from 100 to 1 kPa, preferably from 50 to 2 kPa. The final polycondensation reaction in the second vessel is carried out under the conditions of the reaction temperature within a range from 265 to 300° C., preferably 270 to 290° C., and the reaction pressure within a range from 1000 to 10 Pa, preferably from 500 to 30 Pa.

In the manner described above, the polyester for constituting the polyester film can be produced and the resulting polyester is formed into granules (chips) by extruding in a molten state and then cooling. The resulting polyester preferably has an intrinsic viscosity (hereinafter referred to as IV) within a range from 0.40 to 0.80 dl/g, and more preferably from 0.50 to 0.70 dl/g.

The polyester film of the present invention may be a single-layer film, or a laminate film comprising two or more layers. In case of the laminated film, one or more layers may comprise the polyester film of the present invention, and preferably all layers comprise the polyester film of the present invention.

Manufacturing conditions such as drawing conditions upon forming into a film may be appropriately established in response to physical properties such as surface properties, density and thermal shrinkage, of the target film. For example, the above-mentioned undrawn film is monoaxially drawn (in a longitudinal or lateral direction) at a draw ratio of 2.5 times or more, preferably 3 times or more, at a temperature within a range from [Tg−10] to [Tg+60]° C., and then drawn in a direction perpendicular to the above drawing direction at a draw ratio of 2.5 times or more, preferably 3 times or more, at a temperature within a range from Tg to [Tg+70]° C. If necessary, the resulting drawn film may be further drawn in a longitudinal or transverse direction. An area draw ratio which is the product of the longitudinal draw ratio and the transverse draw ratio is preferably 9 or more, more preferably 12 to 35, and particularly preferably 15 to 30. After drawing, the drawn film may be subjected to a heat set treatment and, if necessary, the drawn film may be subjected to a relaxing heat treatment before or after the heat set treatment. The heat set treatment is preferably carried out at a temperature within a range from [Tg+70] to [Tm−10]° C. (Tm: melting point of polyester), for example, 180 to 250° C. and the heat set time is preferably within a range from 1 to 60 seconds.

In the polyester film of the present invention, inert particles having an average particle size of 0.05 to 5.0 μm may be added as a lubricant in an amount of about 0.05 to 50% by weight for the purpose of improving the handling property. Examples of the inert particles to be added include colloidal silica, porous silica, titanium oxide, calcium carbonate, calcium phosphate, barium sulfate, alumina, zirconia, kaolin, and complex oxide particles, crosslinked polystyrene particles, crosslinked acrylic resin particles, crosslinked methacrylic resin particles and silicone particles.

In an embodiment (4) of the present invention, when the transesterification reaction of a dialkylester of an aromatic dicarboxylic acid with ethylene glycol is carried out in the presence of the catalyst system and the polycondensation reaction is carried out to produce a polyester resin, dimethyl terephthalate recovered by depolymerizing a polyalkylene terephthalate is used as a portion of 70% by weight or more of the dialkylester of the aromatic dicarboxylic acid. At this time, the catalyst system is preferably used after preparing so as to meet the above-mentioned requirements (a), (b) and (c).

In the embodiment (4), the polyalkylene terephthalate subjected to the depolymerization is preferably polyethylene terephthalate and, for example, recovered polyesters such as recovered bottles, recovered polyester fiber products, recovered polyester film products and scrap polymers generated in the manufacturing processes of these products are used particularly preferably. In case dimethyl terephthalate obtained by depolymerizing the polyalkylene terephthalate is used in an amount less than 70% by weight, a proportion of the component originating from the recovered dimethyl terephthalate is less than 50% among the components contained in the finally obtained polyester or polyester fibers, and thus reducing an impression of environmentally friendly product. Therefore, it is not preferred. The dimethyl terephthalate obtained by depolymerizing the polyalkylene terephthalate is preferably used in an amount of 80% by weight or more, and more preferably 90% by weight or more.

The process for producing the dimethyl terephthalate obtained by depolymerizing the polyalkylene terephthalate used in the present invention is not specifically limited and includes, for example, procedures of depolymerizing polyethylene terephthalate with ethylene glycol, transesterifying with methanol and purifying the resulting dimethyl terephthalate by means of recrystallization or distillation. Among impurities contained in dimethyl terephthalate obtained by depolymerizing the polyalkylene terephthalate, the content of 2-hydroxyterephthalic acid is preferably 2 ppm or less.

The polyester produced by the above procedures can be used to produce fibers, films and bottles. Fibers can be produced by the procedures described in the embodiment (2), and the films can be produced by the procedures described in the embodiment (3).

In an embodiment (5) of the present invention, a polyethylene terephthalate film is produced by the process of the present invention. In this embodiment the content of impurities contained in terephthalic acid (TA) used as a starting material is controlled as follows: the content of monomethyl terephthalate (MMT) is controlled to 1000 ppm or less and the total content of 4-carboxybenzaldehyde (4-CBA), para-toluic acid (p-TA), benzoic acid (BA) and dimethyl hydroxyterephthalate (HDT) is controlled to 1 ppm or less. Terephthalic acid may be obtained by depolymerizing a used polyester packaging material by heating in an alkylene glycol and hydrolyzing dimethyl terephthalate (DMT) obtained by transesterifying the depolymerization product with methanol. As the polycondensation catalyst system, a reaction product of a titanium alkoxide of the general formula (4) with a phosphorus compound of the general formula (1) in employed. The ratio of the molar amount of phosphorus atoms to that of titanium atoms in the catalyst is preferably 1.0 or more and less than 8.0.

In the embodiment (5), in order to obtain terephthalic acid, which contains MMT in a content of 1000 ppm or less, the hydrolysis reaction of DMT is preferably carried out at a temperature within a range from 230 to 260° C. under a pressure within a range from 3.0 to 4.6 MPa (gauge pressure), and more preferably at a temperature within a range from 250 to 260° C. under a pressure within a range from 4.0 to 4.6 MPa (gauge pressure), for 2 to 3 hours. MeOH produced during the hydrolysis reaction is removed, together with dimethyl ether produced as a by-product, by introducing stripping steam into a reactor.

TA produced during the hydrolysis reaction is collected by suspending or dissolving in water, discharging it out of the reactor, and subjecting it to a plurality of crystallization treatments and to a solid-liquid separation procedure. The resulting TA cake can be subjected to drying, grinding and preparing a slurry and then to a esterification reaction and the polycondensation reaction.

The content of MMT in the terephthalic acid obtained by the above procedures is 1000 ppm, while the total content of 4-CBA, p-TA, BA and HDT is 1 ppm or less, and therefore terephthalic acid is suitable for a polyester resin for film.

Since TA contains MMT in an amount of less than 1000 ppm, glycol terminals of polyethylene terephthalate obtained by the polycondensation reaction are blocked and the thermal stability thereof is improved. However, if the content exceeds 1000 ppm, the transparency of the resulting polyethylene terephthalate may be decreased.

In the polyethylene terephthalate resin of the embodiment (5), it is preferred that the TA component accounts for 85 molar % based on the entire acid component, and the ethylene glycol component accounts for 85 molar % based on entire diol component.

The total content of the poly(alkylene aromatic dicarboxylate ester) resin other than polyethylene terephthalate, which may be contained in the polyethylene terephthalate of the embodiment (5), is 15 molar % or less and the acid component may be selected from aromatic dicarboxylic acid components for example, 2,6-naphthalenedicarboxylic acid, 2,7-naphthalenedicarboxylic acid, 1,5-naphthalenedicarboxylic acid, 1,7-naphthalenedicarboxylic acid, other isomers of naphthalenedicarboxylic acids, isophthalic acid, diphenyldicarboxylic acid, diphenoxyethanedicarboxylic acid, diphenyletherdicarboxylic acid and diphenylsulfonedicarboxylic acid; alicyclic dicarboxylic acid components, for example, hexahydroterephthalic acid and hexahydroisophthalic acid; aliphatic dicarboxylic acid components, for example, adipic acid, sebacic acid and azelaic acid; and difunctional carboxylic acid components, for example, hydroxycarboxylic acids such as p-β-hydroxyethoxybenzoic acid and ε-oxycaproic acid. The diol component other than ethylene glycol may be at least one member selected from trimethylene glycol, tetramethylene glycol, hexamethylene glycol, decamethylene glycol, neopentyl glycol, diethylene glycol, 1,1-cyclohexane dimethanol, 1,4-cyclohexane dimethanol, 2,2-bis(4'-β-hydroxyphenyl)propane and bis(4'-β-hydroxyethoxyphenyl)sulfone. Furthermore, a tri- or poly-functional compound may be copolymerized in the amount of 10% or less.

In the embodiment (5), a drawn polyester film is produced by melt-extruding the polyester resin obtained by the above procedures and quenching the extruded melt stream to form a undrawn film, and biaxially drawing the undrawn film. After drawing, the resulting polyester film is optionally subjected to a heat set treatment and/or a relaxing heat treatment, if necessary.

In an embodiment (6) of the present invention, a polyester film is produced from a polyester resin which is produced by the procedures in which a used polyester material is subjected to the depolymerization reaction, the transesterification treatment and the hydrolysis treatment, to prepare an alkyl aromatic dicarboxylate ester containing dimethyl terephthalate in a content of 70% by weight or more; the resultant alkyl aromatic dicarboxylate ester and ethylene glycol are transesterified in the presence of a portion of the catalyst system; the resultant reaction mixture is added with the remaining portion of the catalyst system and the ester or oligomer contained in the reaction mixture is polycondensed, to produce the polyester resin. In this case, a mixture of a titanium compound component (1) with a phosphorus compound component (2a) is used as the catalyst system. The titanium compound component (1) is used as the catalyst in the transesterification reaction, and then the phosphorus compound component (2a) is added for the polycondensation reaction of the resulting ester or an oligomer thereof. The catalyst preferably meets the above-mentioned requirements (a), (b) and (c). In the resulting polyester resin, the content of repeating ethylene terephthalate units is preferably 80 molar % or more based on the amount of all the ester repeating units. The dicarboxylic acid component and the diol component of repeating non-ethylene terephthalate units in the polyester may be the same as those described in the embodiment (5).

In the procedures of the embodiment (6), dimethyl terephthalate obtained by depolymerizing the polyalkylene terephthalate is preferably used, as the dialkylester of the aromatic dicarboxylic acid which is a starting material of the polyester, in the content of 50 molar % or more based on total molar amount of the acid component for the polyester.

As the polyalkylene terephthalate, polyethylene terephthalate is preferred, and recovered polyesters such as recovered PET bottles, recovered polyester fiber products, recovered polyester film products and scrap polymers generated in the manufacturing processes of these products are used particularly preferably.

In case dimethyl terephthalate obtained by depolymerizing the polyalkylene terephthalate is used in the content of 70% by mass or less, a proportion of the component originating from the recovered dimethyl terephthalate is less than 50% among the components contained in the polyester obtained finally or polyester fibers, and thus the efficiency of the used polyester products in reuse thereof is insufficient. The content of dimethyl terephthalate obtained by depolymerizing the polyalkylene terephthalate is preferably 80% by weight or more, and more preferably 90% by weight or more, based on the total amount of the dialkyl aromatic dicarboxylate ester.

When the recycleded dimethyl terephthalate is employed, procedures for producing the dimethyl terephthalate are not specifically limited. For example, in the procedures, polyethylene terephthalate is depolymerized with ethylene glycol, the resultant product is transesterified with methanol and the resulting dimethyl terephthalate is purified by means of recrystallization or distillation. Among impurities contained in dimethyl terephthalate obtained by depolymerizing the polyalkylene terephthalate, the content of 2-hydroxyterephthalic acid is preferably 2 ppm or less.

The intrinsic viscosity of the polyester usable for the polyester film is not specifically limited. Usually, it is preferably within a range from 0.50 to 0.80, more preferably from 0.55 to 0.75, and particularly preferably from 0.60 to 0.70. When the intrinsic viscosity is within the above range, the resulting film has a sufficient mechanical strength and the polymer for the film is not necessary to have an excessively increased intrinsic viscosity. Therefore, it is economically advantageous.

The process for producing the polyester film is not specifically limited and the polyester film can be produced by melt-extruding the polyester resin obtained by the above process and quenching the resin to form a undrawn film, and biaxially drawing the undrawn film. After drawing, the resulting polyester film may be subjected to a heat set treatment and/or a relaxing heat treatment, if necessary.

In an embodiment (7) of the present invention, for the production of a polyester resin having an ethylene terephthalate structures as principal repeating units, a mixture of a titanium compound component (1) and a phosphorus compound component (2b) comprising at least one member selected from the phosphorus compound of the general formulae (2) and (3) is used as a catalyst system. A titanium alkoxide usable for the titanium compound component (1) is preferably selected from the compound of the general formula (4). The catalyst system usable for the embodiment (7) preferably meets the above-mentioned requirements (a), (b) and (c).

In the embodiment (7), an ester of terephthalic acid with ethylene glycol, or an oligomer thereof is preferably produced by the transesterification reaction of the dialkylester of terephthalic acid with ethylene glycol, and the dialkylester of terephthalic acid is preferably dimethyl terephthalate. A portion or all of dimethyl terephthalate subjected to the transesterification reaction may be one regenerated from used shaped articles (for example, fibers, films and bottles) of a polyester resin, preferably a polyethylene terephthalate resin.

The polyester film obtained by the procedures of the embodiment (7) can be used to produce fibers. The polyester for this use preferably has an intrinsic viscosity (o-chlorophenol, 35° C.) within a range from 0.40 to 0.80, more preferably from 0.45 to 0.75, and particularly preferably from 0.50 to 0.70. The intrinsic viscosity of less than 0.40 is not preferred, because the resulting fibers have poor mechanical strength. On the other hand, when the intrinsic viscosity exceeds 0.80, and when the resulting polyester is subjected to melt spinning the melt of the polyester may exhibit an excessively increased viscosity.

When polyester fibers are produced from the polyester resin of the embodiment aspect (7), the fiber-producing procedures used in the embodiment (4) may be utilized.

EXAMPLES

The present invention will be explained by way of the following Examples.

In the following Examples and Comparative Examples, the resulting polyester resins, fibers and films were subjected to the following tests.

1. Intrinsic Viscosity 0.6 g of a polyester was heat-dissolved in 50 ml of ortho-chlorophenol and after cooling to room temperature, the viscosity of the resulting polyester solution was measured a temperature of 35° C. using an Ostwald viscometer and the intrinsic viscosity (IV) of the polyester was calculated from data of the resulting solution viscosity.

2. Color Tone of Polymer (Color Value L and Color Value b)

A sample of a polymer was melted at 290° C. under vacuum for 10 minutes, the melt was formed into a plate having a thickness of 3.0±1.0 mm on an aluminum plate, and then immediately quenched in ice water. The resulting plate was dried at 160° C. for one hour, subjected to a crystallization treatment and then placed on a white standard plate for adjusting a color difference meter. The color value L and the color value b were measured by a Hunter type color difference meter CR-200 manufactured by Minolta Co., Ltd. The value L indicates the brightness and the larger the numerical value, the higher the brightness. The larger the value b, the larger the degree of the yellowish tint.

3. Analysis of Metal Content

The concentration of titanium atoms and the concentration of phosphorus atoms in the catalyst were determined in the following manner. In case of a catalyst solution, the catalyst solution was placed as a sample, into a liquid cell, while in case of being contained in the polyester resin, a granular polyester sample containing the catalyst was melted with heating on an aluminum plate and formed into a formed article having a planar surface using a compression presser. Then, each sample was quantitatively analyzed by a fluorescent X-ray spectrometer (Model 3270E, manufactured by Rigaku Denki Co., Ltd.).

The concentration of titanium atoms in a polymer, to which titanium oxide was added as a delusterant, was determined in the following manner. A sample was dissolved in hexafluoroisopropanol and titanium oxide particles were sedimentated from the solution using a centrifugal separator. After recovering only a supernatant liquid by a decantation process, the solvent in the recovered supernatant liquid was vaporized to produce a test sample, which was subjected to the measurement.

4. Diethylene Glycol (DEG) Content

A polymer was decomposed by using hydrazine hydrate and the content of diethylene glycol in the decomposition product was measured by gas chromatography (model: 263-70, manufactured by Hitachi, Ltd.).

5. Color Tone of Drawn Film (Color Value L and Color Value b)

Five pieces of a biaxially drawn polyester film were superimposed on each other and the resulting superimposed pieces were crystallized by heat-treating in a drying machine at 160° C. for 90 minutes. Then, the value L and the value b of the film were measured by a color machine, Model CM-7500, manufactured by Color Machine Co., Ltd.

6. Haze

A granular polymer sample was heat-treated and dried in a drying machine at 150° C. for 6 hours, melted with heating at 290° C. in a melt extruder, extruded in the form of a sheet onto a rotary cooling drum and then rapidly cooled and solidified to produce a undrawn film (sheet) having a thickness of 500 μm. After sampling a portion of the resultant undrawn film free from surface scratch, the Haze value of the sample was measured by a turbidimeter (HDH-1001DP) manufactured by Nippon Denshoku Industries Co., Ltd.

7. Thermal Stability (Undrawn Film)

A value (A) of the intrinsic viscosity of the sample of an the undrawn film prepared for the measurement of Haze and a value (B) of the intrinsic viscosity of a polymer used to produce the undrawn film were determined. The thermal stability of the undrawn film to be tested was evaluated from a difference value (B−A) in accordance with the following criteria.

| Special class | 0–0.05 (particularly excellent thermal stability) |
| First class | 0.05–0.10 (excellent thermal stability) |
| Second class | 0.10–0.15 (good thermal stability) |
| Third class | >0.15 (poor thermal stability) |

8. Thermal Stability (Biaxially Drawn Film)

Five pieces of a biaxially drawn polyester film were superimposed on each other and the resulting superimposed pieces were crystallized by heat-treating in a drying machine at 160° C. for 90 minutes and a value (A) of the intrinsic viscosity of the resulting biaxially drawn film and a value (B) of the intrinsic viscosity of a polymer used to produce the biaxially drawn film were determined. The thermal stability was evaluated from a difference value (B−A) in accordance with the following criteria.

| Special class | 0–0.05 (particularly excellent thermal stability) |
| First class | 0.05–0.10 (excellent thermal stability) |
| Second class | 0.10–0.15 (ordinary thermal stability) |
| Third class | >0.15 (poor thermal stability) |

9. Analysis of Dimethyl Terephthalate (a) Content of Dimethyl 2-Hydroxyterephthalate Dimethyl terephthalate was dissolved in an acetone solvent and the content of dimethyl 2-hydroxyterephthalate in this solution was determined by gas chromatography (Model HP5890, manufactured by Hewlett-Packard Company; capillary column DB-17, manufactured by J&W Inc.) and then determined by mass spectrometric analysis using GC-MASS (GC/mass spectrometer, Model HP6890/HP5973, manufactured by Hewlett-Packard Company; capillary column DB-17, manufactured by J&W Inc.).

10. Analysis of Terephthalic Acid (a) Mass Concentrations of 4-Carboxybenzaldehyde, Paratoluic Acid and Hydroxybenzaldehyde A sample of test terephthalic acid was dissolved in 2N ammonia water and the resulting solution was subjected to a liquid chromatograph system (LC-6A, STRΦDS-H column) manufactured by Shimadzu Corporation and, after separating 4-carboxybenzaldehyde, paratoluic acid and hydroxybenzaldehyde from the solution, the mass concentrations of the compounds were measured.

(b) Mass Concentration of Monomethyl Terephthalate

A sample of terephthalic acid to be tested was subjected to high speed liquid chromatography (apparatus: Model HPLC D-7000, manufactured by Hitachi, Ltd.; packed column: RP-18, 2 columns) and then the mass concentration of monomethyl terephthalate contained in the sample was measured.

(c) Mass Concentration of Benzoic Acid

After a sample of terephthalic acid to be tested was esterified with diazomethane, the resulting ester was subjected to gas chromatography using 10% SE-30 as a separation column and the mass concentration of benzoic acid contained in the sample was measured by using n-tridecane as an internal standard.

11. Layers of Deposit Formed Around Spinneret

After a polyester to be tested was formed into chips, the resulting chips were melted at 290° C., and the melt was extruded through a spinneret having 12 spinning orifices each having a hole diameter of 0.15 mmΦ, and the melt-spinning was continuously carried out at a spinning speed of 600 m/min for 2 days. Then, a height of each layer of a deposit formed on the outer peripheries of a spinning orifices of the spinneret was measured. A bending of filamentary stream of the extruded polyester melt is promoted with increase in the height of the deposit layer formed around the outer edge of the spinning orifice, and the formability of the polyester becomes poor. That is, the height of the deposit layer formed around the spinning orifice is an index of the formability of the polyester.

12. Tensile Strength and Ultimate Elongation of Fibers

The tensile strength and the ultimate elongation of fibers were measured in accordance with the procedure described in JIS L 1013.

Production Example 1

Synthesis of Titanium Trimellitate

To an ethylene glycol solution prepared by mixing 2 parts by mass of trimellitic anhydride with 98 parts by mass of ethylene glycol, tetrabutoxytitanium was added in an amount enough to control a molar ratio thereof to trimellitic anhydride to 0.5, and then the resulting mixture was reacted by maintaining in an air at a temperature of 80° C. under the ambient atmospheric pressure for 60 minutes. After cooling it to room temperature, the product was subjected to recrystallization from acetone in an amount of 10 times that of the product and, the resultant deposit was collected by filtering through a filter paper and dried at 100° C. for 2 hours, to prepare the target titanium compound.

Example 1

A mixture of 100 parts by mass of dimethyl teraphthalate with 70 parts by mass of ethylene glycol was admixed with 0.009 parts by mass of tetra-n-butyl titanate in an SUS (stainless steel) vessel in which a reaction under pressure can be carried out and the resulting admixture was subjected to transesterification in the vessel by increasing the temperature from 140° C. to 240° C. under a pressure of 0.07 MPa. Then, 0.04 parts by mass of triethyl phosphonoacetate was added to the reaction mixture, to complete the transesterification reaction.

The reaction product was placed in a polymerization vessel and then subjected to a polycondensation reaction by heating it to a temperature of 290° C. under high vacuum of 26.7 Pa (0.2 mmHg) or less to produce a polyethylene terephthalate resin which has an intrinsic viscosity of 0.60 and contains diethylene glycol in a content of 1.5% by mass (based on the molar amount of an ethylene terephthalate component).

The polyethylene terephthalate resin was continuously extruded in the form of filamentary streams through a extruding orifices of a melt-spinning apparatus, and then the filamentary streams were cooled and cut into granular pellets each having a length of about 3 mm. The resulting pellets were dried at 180° C. for 3 hours and then subjected to a melt spinning procedure to produce an undrawn filament yarn having a yarn count of 333 dtex/36 fil. Then, the undrawn filament yarn was drawn at a draw ratio of 4.0, to provide a drawn multi-filament yarn having a yarn count of 83.25 dtex/36 fil.

Separately the same dry pellets as mentioned above were fed in a single-screw kneading extruder (inner diameter: 65 mm, path length: 1000 mm, residence time: 10 minutes), melt-kneaded while gradually raising the temperature of the feed in the extruder from 280° C. to 300° C., and then the polyester melt was extruded through a die to produce a undrawn film. The resulting undrawn film was biaxially drawn at 90° C. at a longitudinal draw ratio of 3.5 and a transverse draw ratio of 4.0, and then heat set at 200° C., to produce a film having a thickness of 15 μm.

Example 2

A polyester resin was produced in the same manner as in Example 1, except that the polycondensation reaction was carried out using 0.016 parts by mass of titanium trimellitate synthesized in Production Example 1 as a titanium compound. The properties of the resulting polyester composition fibers and undrawn film produced by using the polyester composition are shown in Table 1.

Examples 3 to 9 and Comparative Examples 1 to 7

In each of Examples 3 to 9 and Comparative Examples 1 to 7, a polyester resin composition was produced by the same procedures as in Example 1, except that the types and amounts of the titanium compound and the phosphorus compound were changed as shown in Table 1. The properties of the resulting polyester resins and the undrawn film obtained by using the same are shown in Table 1.

Comparative Example 8

A mixture of 100 parts by mass of dimethyl teraphthalate and 70 parts by mass of ethylene glycol was admixed with 0.009 parts by mass of tetra-n-butyl titanate in an SUS (stainless steel) vessel in which a reaction under a pressure can be carried out and the resulting mixture was subjected to a transesterification reaction by heating it from 140° C. to 240° C. under a pressure of 0.07 MPa. Then, 0.04 parts by mass of triethyl phosphonoacetate was added to the reaction admixture, to complete the transesterification reaction.

After 0.053 parts by mass of diantimony trixoide was added to the resultant reaction mixture, the mixture was placed in a polymerization vessel and then subjected to a polycondensation reaction by heating it to 290° C. under high vacuum of 26.67 Pa (0.2 mmHg) or less, to produce a polyester resin which had an intrinsic viscosity of 0.60 and contained diethylene glycol in a content of 1.5% by mass.

Example 10

A polyester resin was produced and then fibers were produced by same procedures as in Example 1, except that the amounts of the titanium compound and the phosphorus compound were changed as shown in Table 1 and, after the completion of the transesterification reaction, 20% by mass of titanium oxide having an average particle size of 0.3 μm and 1.5 parts by mass of an ethylene glycol slurry were added to the resultant reaction mixture. The measurement results are shown in Table 1.

Example 11

The same procedures as in Example 1 were carried out to produce-a polyester resin and fibers, except that the amounts of the titanium compound and the phosphorus compound were changed as shown in Table 1 and, after the completion of the transesterification reaction, 0.02 parts by mass of pentaerythritol-tetrakis[3-(3,5-di-tert-butyl-4-hydroxyphenyl)propionate] (manufactured by Ciba Speciality Chemicals Inc., under the trademark of Irganox 1010) was added to the resultant reaction mixture. The measurement results are shown in Table 1.

Example 12

A slurry prepared by mixing 200 parts by mass of terephthalic acid with 105 parts by mass of ethylene glycol was charged in a reactor equipped with a stirrer, a rectifying column and a water distillation condenser. Then, the slurry was subjected to an esterification reaction at 270° C. under a pressure of 0.3 MPa for 240 minutes. After a half portion of the resulting reaction mixture was removed, the residual half portion of the reaction mixture was maintained at a temperature of 250° C. and 100 parts by mass of terephthalic acid, and 52 parts by mass of an ethylene glycol slurry were fed into the reaction system under the ambient atmospheric pressure over 150 minutes. Then, the esterification reaction was carried out under the ambient atmospheric pressure over 90 minutes. During the reaction, the temperature of the reaction system was maintained at 250° C.

After the half portion of the resulting reaction product was removed, 100 parts by mass of terephthalic acid and 52 parts by mass of an ethylene glycol slurry were fed and the esterification reaction was carried out, and then these procedures were repeated until the content of diethylene glycol in the reaction product is stabilized.

After the content of diethylene glycol in the reaction product was stabilized, a half portion of the reaction product mixture obtained by the esterification reaction was transferred to a polycondensation reaction apparatus and 0.018 parts by mass of the titanium catalyst produced in Preliminary Example 1 and 0.040 parts by mass of triethyl phosphate were added thereinto. Then, the polycondensation reaction was carried out by heating the mixture to 285° C. under high vacuum of 26.67 Pa or less to produce a polyester which had an intrinsic viscosity of 0.62 and contained diethylene glycol in a content of 1.0% by mass, and fibers were produced by using the polyester by the same procedure as in Example 1. The measurement results are shown in Table 1.

TABLE 1

| | Polyester polymer | | | | | | | | | | | |
|---|---|---|---|---|---|---|---|---|---|---|---|---|
| | Titanium compound | | Phosphorus compound | | Molar ratio | | Sb compound ($Sb_2O_3$) | Titanium oxide (% | | | Color tone | |
| | Kind | Content (mmol %) | Kind | Content (mmol %) | $M_P/M_{Ti}$ | $M_{Ti}+M_P$ | mmol % | by mass) | Antioxidant | IV | Value L | Value b |
| Example 1 | TBT | 5 | TEPA | 30 | 6 | 35 | — | — | — | 0.620 | 79.0 | 3.0 |
| Example 2 | TNT | 5 | TEPA | 30 | 6 | 35 | — | — | — | 0.620 | 80.0 | 2.8 |
| Example 3 | TNT | 5 | PEE | 30 | 6 | 35 | — | — | — | 0.620 | 78.0 | 3.0 |
| Example 4 | TNT | 5 | HPE | 30 | 6 | 35 | — | — | — | 0.620 | 78.0 | 3.0 |
| Example 5 | TNT | 3 | TEPA | 15 | 5 | 18 | — | — | — | 0.600 | 80.0 | 2.3 |
| Example 6 | TNT | 7 | TEPA | 50 | 7 | 57 | — | — | — | 0.600 | 80.0 | 3.3 |
| Example 7 | TNT | 5 | Orthophosphoric acid | 30 | 6 | 35 | — | — | — | 0.600 | 76.0 | 4.3 |
| Example 8 | TNT | 5 | TMP | 30 | 6 | 35 | — | — | — | 0.600 | 77.0 | 4.0 |
| Example 9 | Titanium oxide | 5 | TEPA | 30 | 6 | 35 | — | — | — | 0.600 | 78.0 | 4.5 |
| Example 10 | TNT | 5 | TEPA | 30 | 6 | 35 | — | 0.3 | — | 0.620 | 75.5 | 7.5 |
| Example 11 | TNT | 5 | TEPA | 30 | 6 | 35 | — | — | 200 | 0.620 | 80.5 | 2.0 |
| Example 12 | TNT | 6 | TEPA | 30 | 6 | 35 | — | — | — | 0.620 | 82.1 | 0.3 |
| Comparative Example 1 | TNT | 15 | TEPA | 45 | 3 | 60 | — | — | — | 0.640 | 77.0 | 12.0 |
| Comparative Example 2 | TNT | 25 | TEPA | 50 | 3 | 75 | — | — | — | 0.640 | 77.0 | 12.0 |
| Comparative Example 3 | TNT | 1.5 | TEPA | 10 | 6.7 | 11.5 | — | — | — | 0.450 | 83.0 | −1.0 |
| Comparative Example 4 | TNT | 5 | TEPA | 7 | 1.4 | 12 | — | — | — | 0.640 | 77.0 | 11.0 |
| Comparative Example 5 | TNT | 5 | TEPA | 90 | 18 | 95 | — | — | — | 0.520 | 83.0 | 0.0 |
| Comparative Example 6 | TNT | 9 | TEPA | 100 | 11.1 | 109 | — | — | — | 0.600 | 78.0 | 3.0 |
| Comparative Example 7 | TNT | 2 | TEPA | 7 | 3.5 | 9 | — | — | — | 0.600 | 80.0 | 2.0 |

TABLE 1-continued

| | | | | | | | | | | | |
|---|---|---|---|---|---|---|---|---|---|---|---|
| Comparative Example 8 | TBT | 5 | TEPA | 30 | 6 | 35 | 31 | — | — | 0.640 | 70.0 | 2.5 |

| | Properties of non-stretched film | | Properties of fibers | | Height of spinneret |
|---|---|---|---|---|---|
| | Haze value | Thermal stability | Tensile strength (cN/dtex) | Ultimate elongation (%) | foreign matters (μm) |
| Example 1 | 0.2 | 0.02 | 3.7 | 27 | 3 |
| Example 2 | 0.2 | 0.02 | 3.8 | 26 | 4 |
| Example 3 | 0.2 | 0.02 | 3.8 | 28 | 4 |
| Example 4 | 0.2 | 0.02 | | | |
| Example 5 | 0.2 | 0.01 | 3.6 | 27 | 2 |
| Example 6 | 0.2 | 0.02 | 3.7 | 25 | 4 |
| Example 7 | 0.3 | 0.05 | | | |
| Example 8 | 0.3 | 0.04 | 3.6 | 26 | 3 |
| Example 9 | 0.2 | 0.03 | 3.6 | 29 | 4 |
| Example 10 | | | 3.8 | 27 | 3 |
| Example 11 | | | 3.8 | 26 | 4 |
| Example 12 | | | 3.7 | 27 | 3 |
| Comparative Example 1 | 0.3 | 0.07 | | | |
| Comparative Example 2 | | | 3.8 | 26 | 5 |
| Comparative Example 3 | impossible to form film | | 3.0 | 23 | 2 |
| Comparative Example 4 | 0.2 | 0.03 | 3.9 | 28 | 3 |
| Comparative Example 5 | impossible to form film | | 3.2 | 22 | 4 |
| Comparative Example 6 | 0.9 | 0.09 | 3.7 | 29 | 4 |
| Comparative Example 7 | impossible to form film | | 3.6 | 27 | 3 |
| Comparative Example 8 | 1 | 0.04 | 3.9 | 28 | 50 |

Production Example 2

Synthesis of Catalyst

In a 2 liter three-necked flask equipped with a function capable of mixing a solution with stirring, 808 g of ethylene glycol and 50 g of acetic acid were charged and mixed with each other by stirring, and then 142 g of titanium tetrabutoxide was slowly added to the mixture, to provide a transparent ethylene glycol solution of a titanium compound. The resulting solution is referred to as a "TB solution". The titanium concentration of the TB solution was measured using fluorescent X-rays. As a result, the Ti concentration was 2.0%.

Further, in a 2 liter three-necked flask equipped with a function capable of mixing a solution with stirring, 896 g of ethylene glycol was charged and 224 g of triethyl phosphonoacetate was added thereto while stirring to provide a transparent solution. This solution is referred to as a "TP1 solution".

Subsequently, the TP1 solution was heated, the temperature of the solution was controlled to 160° C., and 400 g of the previously prepared TB solution was gradually added to the TP1 solution. After adding the total amount of the TB solution, stirring was continued at a temperature of 160° C. for one hour, thereby completing the reaction of the titanium compound component with the phosphorus compound component. At this time, a ratio of the amount of the TP1 solution to that of the Tb solution was controlled to 6.0 in terms of a ratio of a molar concentration of phosphorus atoms to titanium atoms. The reaction product is a solution which is soluble in ethylene glycol and has a pale yellowish tint. The resulting solution is referred to as a "TT-6 catalyst".

Production Example 3

A catalyst was produced by using the same apparatus and procedure as those in Production Example 2, except that the prepared amount and added amount of the TP1 solution described in Production Example 2 were changed as described hereinafter. In basically the same reactor as mentioned above, 1045 g of ethylene glycol was charged and 75 g of ethylene glycol was added thereto while stirring to provide a transparent solution. This solution is referred to as a "TP2 solution". Subsequently, the TP2 solution was heated to control the temperature of the solution to 120° C. and 400 g of the previously prepared TB solution was gradually added thereto while stirring the mixture. After adding the total amount of the TB solution, stirring was continued at a temperature of 120° C. for 3 hours, thereby completing the reaction of the titanium compound component with the phosphorus compound component. At this time, a ratio of the amount of the P1 solution to that of the Tb solution was controlled to 2.0 in terms of a ratio of a molar concentration of phosphorus atoms to titanium atoms. As a result, a transparent solution was obtained. The resulting solution is referred to as a "TT-2 solution".

Example 13

In a reactor containing 225 parts of an oligomer of an ethylene glycol terephthalate ester, a slurry prepared by mixing 179 parts of high purity terephthalic acid with 95 parts of ethylene glycol was fed at a uniform feed rate while stirring under the conditions in a nitrogen atmosphere at 255° C. under the ambient atmospheric pressure, and then the esterification reaction was continued for 4 hours while distilling off water and ethylene glycol produced during the reaction out of the system, thereby completing the reaction. At this time, the degree of esterification was 98% or more and the degree of polymerization of the resulting oligomer was about 5 to 7.

225 parts of the oligomer obtained by the esterification reaction was transferred to a polycondensation reactor and the oligomer was mixed with 0.182 parts of the titanium-phosphorus reaction product TT-6 catalyst solution described in Production Example 2 as a polycondensation catalyst. Subsequently, the reaction temperature in the system was increased from 255° C. to 290° C. and the reaction pressure was reduced stepwise from atmospheric pressure to 60 Pa, and then the polycondensation reaction was carried out while removing water and ethylene glycol produced during the reaction out of the reaction system.

The proceeding degree of the polycondensation reaction was detected while monitoring the load on a stirring blade in the system and the reaction was completed upon reaching a desired polymerization degree. At this time, the polycondensation reaction time was 160 minutes. Then, the reaction product in the system was continuously extruded into a strand form through a extruding orifice of a melt sipping apparatus, and then the strand-formed stream was cooled and cut to provide granular pellets each having a length of about 3 mm. The resulting pellets were dried at 180° C. for 3 hours and then fed in a single-screw kneading extruder (inner diameter: 65 mm, path length: 1000 mm, residence time: 10 minutes), melt-kneaded while gradually increasing a temperature in the extruder from 280° C. to 300° C., and then the molten polyester was extruded through a die to produce an undrawn film. The resulting undrawn film was biaxially drawn at 90° C. in a longitudinal draw ratio of 3.5 times and a transverse draw ratio of 4.0 times, and then heat set at 200° C. to produce a film having a thickness of 15 μm.

Example 14

A polycondensation reaction was carried out and a film was produced by the same procedures as in Example 13, except that the polycondensation catalyst was replaced by the titanium-phosphorus reaction compound TT-2 solution prepared in Production Example 3. At this case, the polycondensation reaction time was 135 minutes.

The properties of the resulting polyester granular pellets and the polyester film are shown in Table 2.

Example 15

A polycondensation reaction was carried out and a polyester film was produced by the same procedures as in Example 13, except that tetrazole blue (abbreviated to an agent B) as a color-regulating agent was added in an amount of 0.3 ppm based on the amount of the target polymer, in addition to the titanium-phosphorus reaction compound TT-6 solution prepared in Production Example 2. In this case, the polycondensation reaction time was 160 minutes.

The properties of the resulting polyester granular pellets and the polyester film are shown in Table 2.

Example 16

A polycondensation reaction was carried out and a film was produced by the same procedures as in Example 13, except that 0.129 parts of the TB solution and 0.372 parts of the TP1 solution each prepared in Reference Example 2 were separately mixed as the polycondensation catalyst into the reaction system without reacting the TB solution with the TP1 solution. In this case, the polycondensation reaction time was 190 minutes. The properties of the resulting polyester granular pellets and the polyester film are shown in Table 2.

Comparative Example 9

A polycondensation reaction was carried out and a film was produced by the same procedures as in Example 13, except that the amount of TT-2 was changed to 0.546 parts. In this case, the polycondensation reaction time was 135 minutes.

The properties of the resulting polyester granular pellets and the polyester film are shown in Table 2.

Comparative Example 10

A Spolycondensation reaction was carried out and a film was produced by the same procedures as in Example 13, except that the polycondensation catalyst was replaced by an ethylene glycol solution having a concentration of 1.3% of antimony trioxide and the amount of the catalyst was changed to 4.83 parts and, moreover, 0.121 parts of a 25% ethylene glycol solution of trimethyl phosphate as a stabilizer was added. In this case, the polycondensation reaction time was 130 minutes.

The properties of the resulting polyester granular pellets and the polyester film are shown in Table 2.

Comparative Example 11

A polycondensation reaction was carried out and a film was produced by the same procedures as in Example 13, except that the polycondensation catalyst was replaced by the TB solution prepared in Production Example 2 and the amount of the catalyst was changed to 0.129 parts. In this case, the polycondensation reaction time was 105 minutes.

The properties of the resulting polyester granular pellets and the polyester film are shown in Table 2.

TABLE 2

| | | Polyester polymer | | | | | | Properties of film | | | |
| | | | | Sb compound | | Color tone | | | After stretching | | |
| | | | | | | | | | | Color | |
| | Species of catalyst | $M_P/M_{Ti}$ | $M_{Ti} + M_P$ (mmol %) | $(Sb_2O_3)$ (mmol %) | IV | Value L | Value b | Haze before stretching (%) | IV | Value L | Value b | Thermal stability |
|---|---|---|---|---|---|---|---|---|---|---|---|---|
| Example 13 | TT-6 | 5.6 | 33 | — | 0.620 | 79.0 | 2.7 | 0.1 | 0.580 | 80.0 | 3.7 | 0.03 |
| Example 14 | TT-2 | 1.8 | 14 | — | 0.620 | 81.0 | 2.5 | 0.2 | 0.580 | 80.0 | 3.4 | 0.04 |
| Example 15 | TT-6 | 5.6 | 33 | — | 0.520 | 78.0 | 1.4 | 0.2 | 0.580 | 78.0 | 2.8 | 0.04 |
| Example 16 | TB solution + TP1 solution | 5.2 | 31 | — | 0.620 | 80.0 | 4.0 | 0.6 | 0.540 | 82.0 | 5.5 | 0.04 |

TABLE 2-continued

| | Polyester polymer | | | | Properties of film | | | | | |
|---|---|---|---|---|---|---|---|---|---|---|
| | | | Sb compound | | Color tone | | | After stretching | | |
| | | | | | | | | | Color | |
| | Species of catalyst | $M_p/M_{Ti}$ | $M_{Ti} + M_p$ (mmol %) | $(Sb_2O_3)$ (mmol %) | IV | Value L | Value b | Haze before stretching (%) | IV | Value L | Value b | Thermal stability |
| Comparative Example 9 | TT-2 | 1.93 | 44 | — | 0.620 | 81.0 | 4.1 | 0.5 | 0.550 | 82.0 | 5.5 | 0.07 |
| Comparative Example 10 | $Sb_2O_3$ | — | — | 38 | 0.620 | 72.0 | 5.0 | 1.0 | 0.570 | 70.0 | 6.0 | 0.04 |
| Comparative Example 11 | TB solution | — | 15 | — | 0.630 | 82.0 | 7.5 | 0.3 | 0.520 | 83.0 | 11.0 | 0.14 |

Production Example 4

Production of Recovered Dimethyl Terephthalate

200 Parts by mass of ethylene glycol was charged in a 500 ml separable flask and 1.5 parts by mass of sodium carbonate and 50 parts by mass of a polyethylene terephthalate scrap made of ground bottles were further charged into the flask, and then the temperature was increased to 185° C. while stirring. This conditions were kept for 4 hours. As a result, the polyethylene terephthalate scrap was dissolved and the depolymerization reaction was completed. The resulting depolymerization reaction product was concentrated by a vacuum distillation and, 150 parts by mass of ethylene glycol was recovered as a distillate fraction.

Into the concentrated solution, 0.5 Parts by mass of sodium carbonate as a transesterification catalyst and 100 parts by mass of methanol were mixed, and then the reaction mixture was stirred at a liquid temperature of 75° C. under the ambient atmospheric pressure for one hour, to effect an esterification reaction.

The resulting reaction mixture was cooled to 40° C. and then filtered through a glass filter. Crude dimethyl terephthalate recovered on the filter was mixed with 100 parts by mass of MeOH and the mixture was heated to 40° C., stirred, washed and then filtered again through the glass filter. These washing and filtration procedures were repeated twice.

The crude dimethyl terephthalate collected on the filter was charged in a distillation apparatus and subjected to vacuum distillation under the conditions of a pressure of 6.65 kPa and a reflux ratio of 0.5, thereby to recover dimethyl terephthalate as a distillate fraction. The amount of the recovered fraction was 47 parts by mass. The amount of the residue in the distillation apparatus was measured and the amount of dimethyl terephthalate was measured. As a result, the dimethyl terephthalte was in an amount of 2 parts by mass. The degree of reaction of dimethyl terephthalate was 93% by mass based on the mass of the polyester charged.

In the recovered dimethyl terephthalate purified by the distillation, 0.5 ppm by mass of dimethyl 2-hydroxyterephthalate was detected.

The purified recovered dimethyl terephthalate exhibited a degree of purity of 99.9% by weight or more.

Example 17

A mixture of 100 parts by mass of dimethyl terephthalate prepared in Production Example 4 and 70 parts by mass of ethylene glycol was mixed with 0.0088 parts by mass of tetra-n-butyl titanate in a stainless steel vessel capable of carrying out a reaction under pressure and the resulting mixture was subjected to a transesterification reaction by heating it from 140° C. to 240° C. under a pressure of 0.07 MPa. Then, 0.035 parts by mass of triethyl phosphonoacetate was added to the reaction mixture, thereby completing the transesterification reaction.

The reaction product was transferred to a polymerization vessel and then polycondensation reaction was carried out by heating it to 285° C. under high vacuum of 26.67 Pa or less to produce a polyester which had an intrinsic viscosity of 0.63 and contained diethylene glycol in a content of 1.0% by mass.

The resulting ester was formed into chips using a melt extruder and then dried at 180° C. Using the resulting dry chips, an undrawn filament yarn having a yarn count of 333 dtex/36 filaments was produced by a melt spinning procedure and then the undrawn filament yarn was drawn at a draw ratio of 4.0 to provide a drawn multi-filament yarn having a yarn count of 83.25 dtex/36 filaments. Separately, the dry chips were melt-extruded using a film forming apparatus to provide an undrawn film, which was biaxially drawn at 90° C. at a longitudinal draw ratio of 3.5 and a transverse draw ratio of 4.0, and then heat set at 200° C. to produce a film having a thickness of 15 μm. The measurement results are shown in Table 3.

Example 18

A polyester resin was produced and polyester fibers were produced from the polyester resin by the same procedures as in Example 17, except that the 0.016 parts by mass of titanium trimellitate synthesized by the procedures of Production Example 1 was used as the titanium compound. The measurement results are shown in Table 3.

Examples 19 to 22 and Comparative Examples 12 to 15

In each of Examples 19 to 22 and Comparative Examples 12 to 15, a polyester resin composition and fibers were produced by the same procedures as in Example 17, except that the compounds shown in Table 3 were used as the titanium compound and the phosphorus compound and the amounts were changed as shown in Table 3. The measurement results are shown in Table 3. In each of Comparative Examples 13 and 15, since the polycondensation reaction rate is very low, the polycondensation reaction procedure was ended 200 minutes after the start of the reaction.

Comparative Example 16

A mixture of 100 parts by mass of recovered dimethyl teraphthalate prepared in Production Example 4 and 70 parts by mass of ethylene glycol, was mixed with 0.009 parts by mass of tetra-n-butyl titanate. The resultant mixture was charged in a stainless steel vessel capable of carrying out a reaction under pressure and the resulting mixture was subjected to a transesterification reaction, while heating it from 140° C. to 240° C. under a pressure of 0.07 MPa. Then, 0.04 parts by mass of triethyl phosphonoacetate was added to the reaction mixture, thereby completing the transesterification reaction.

After 0.053 parts by mass of diantimony trixoide was added to the reaction mixture, the mixture was transferred to a polymerization vessel and then polycondensation reaction was carried out by heating it to 285° C. under high vacuum of 26.67 Pa or less to prepare a polyester which had an intrinsic viscosity of 0.63 and contained diethylene glycol in a content of 0.9% by mass. In the same manner as in Example 17, the resulting polyester was formed into fibers and a film. The measurement results are shown in Table 3.

Example 23

DMT was prepared by depolymerizing PET with ethylene glycol and transesterifying the resultant EMT with MeOH and further hydrolyzed to provide TA (in which the sum of 4-CBA, p-TA, BA and HDT is 1 ppm or less and MMT content is 150 ppm). Previously, in a polycondensation reactor containing 225 parts of an oligomer of an ethylene glycol ester of terephthalic acid, a slurry prepared by mixing 179 parts of the recovered TA with 95 parts of ethylene glycol was fed at a uniform feed rate while stirring the mixture in a nitrogen gas atmosphere at 255° C. under the ambient atmospheric pressure, and then the mixture was subjected to an esterification reaction at 275° C. under atmospheric pressure for 4 hours, while distilling off water and ethylene glycol produced during the reaction out of the system until the degree of esterification reaches 98% or more, to produce an oligomer having a degree of polymerization of about 5 to 7.

A portion of the oligomer prepared by the above-mentioned esterification reaction was transferred in an amount of 225 parts by mass to a polycondensation reactor and mixed

TABLE 3

| | Polyester polymer | | | | | | | | | | | |
|---|---|---|---|---|---|---|---|---|---|---|---|---|
| | Titanium compound | | Phosphorus compound | | | | Sb compound | | | | Color tone | |
| | Kind | Content (mmol %) | Kind | Content (mmol %) | $M_p/M_{Ti}$ | $M_{Ti} + M_p$ (mmol %) | ($Sb_2O_3$) (mmol %) | DEG (% by mass) | IV | Value L | Value b |
| Example 17 | TBT | 5 | TEPA | 30 | 6 | 35 | — | 1.0 | 0.620 | 79.0 | 3.2 |
| Example 18 | TNT | 5 | TEPA | 30 | 6 | 35 | — | 1.0 | 0.630 | 80.2 | 2.8 |
| Example 19 | TNT | 5 | PEE | 30 | 6 | 35 | — | 1.0 | 0.630 | 78.2 | 3.1 |
| Example 21 | TNT | 3 | TEPA | 15 | 5 | 18 | — | 1.0 | 0.630 | 80.3 | 2.2 |
| Example 22 | TNT | 7 | TEPA | 50 | 7 | 57 | — | 1.0 | 0.630 | 79.7 | 3.2 |
| Comparative Example 12 | TNT | 25 | | 50 | 3 | 75 | — | 1.1 | 0.630 | 75.2 | 14.3 |
| Comparative Example 13 | TNT | 1.5 | TEPA | 10 | 6.7 | 11.5 | — | 1.0 | 0.450 | 83.1 | −1.0 |
| Comparative Example 14 | | 5 | TEPA | 5 | 1 | 12 | — | 1.0 | 0.630 | 77.2 | 13.1 |
| Comparative Example 15 | TNT | 5 | TEPA | 100 | 20 | 105 | — | 1.1 | 0.510 | 82.1 | −0.4 |
| Comparative Example 16 | TBT | 5 | TEPA | 30 | 6 | 35 | 31 | 0.9 | 0.630 | 70.3 | 2.4 |

| | Properties of film | | | Properties of yarn | | |
|---|---|---|---|---|---|---|
| | Haze before stretching | After biaxial stretching | | Tensile strength | Ultimate elongation | Height of spinneret foreign matters |
| | (%) | IV | Thermal stability | (cN/dtex) | (%) | (μm) |
| Example 17 | 0.2 | 0.580 | 0.04 | 3.7 | 27 | 3 |
| Example 18 | 0.1 | 0.590 | 0.04 | 3.7 | 25 | 3 |
| Example 19 | 0.1 | 0.590 | 0.04 | 3.8 | 26 | 2 |
| Example 21 | 0.1 | 0.590 | 0.04 | 3.6 | 26 | 3 |
| Example 22 | 0.2 | 0.570 | 0.06 | 3.8 | 25 | 3 |
| Comparative Example 12 | 0.8 | 0.550 | 0.08 | 3.7 | 27 | 5 |
| Comparative Example 13 | impossible to perform film-forming operation | | | 3.1 | 23 | 3 |
| Comparative Example 14 | 0.1 | 0.570 | 0.06 | 3.8 | 26 | 2 |
| Comparative Example 15 | impossible to perform film-forming operation | | | 3.1 | 23 | 3 |
| Comparative Example 16 | 1 | 0.590 | 0.04 | 3.9 | 29 | 50 | with 0.45 parts of the "TT-6 catalyst solution" prepared in Production Example 2, as a polycondensation catalyst. Subsequently, the reaction temperature in the reaction system was increased from 255° C. to 290° C. and the reaction pressure was reduced stepwise from the atmospheric pressure, to 60 Pa and then the mixture was subjected to a polycondensation reaction, during the reaction water and ethylene glycol produced from the reaction were removed out of the system.

The degree of the polycondensation reaction and the load on a stirring blade in the system were detected by monitoring them and the reaction was completed upon reaching a desired degree of polymerization degree. In this case, the polycondensation reaction time was 160 minutes. Then, the reaction product in the system was continuously extruded into a strand form stream through an extruding orifice of a solution extruding apparatus, and then the strand-formed stream was cooled and cut to provide granular pellets each having a length of about 3 mm.

The resulting pellets were dried at 180° C. and then formed into a sheet by subjecting it to a melt film-forming procedure, and then resulting sheet was biaxially drawn at 90° C. in a longitudinal draw ratio of 3.5 and a transverse draw ratio of 4.0, and then heat set at 200° C. to produce a film having a thickness of 15 µm.

The properties of the resulting polyester granular pellets and the polyester film are shown in Table 4.

Example 24

A polyester resin was produced and a polyester film was produced, the same procedures as in Example 23, by except that the "TT-2 catalyst solution" prepared in Production Example 3 was used as the polycondensation catalyst in place of the "TT-6 catalyst solution". In this case, the polycondensation reaction time was 135 minutes. The properties of the resulting polyester granular pellets and the polyester film are shown in Table 4.

Example 25

A polyester resin and a polyester film were produced by the same procedures as in Example 23, except that the amount of the "TT-2 catalyst solution" was changed to 1.50 parts. In this case, the polycondensation reaction time was 135 minutes. The properties of the resulting polyester granular pellets and the polyester film are shown in Table 4.

Example 26

A polyester resin and a polyester film were produced in the same procedures as in Example 23, except that 0.13 parts of the "TB solution" and 0.39 parts of the "TP1 solution" prepared in Production Example 2 were separately mixed as the polycondensation catalyst into the reaction system without reacting the "TB solution" with the "TP1 solution". In this case, the polycondensation reaction time was 190 minutes. The properties of the resulting polyester granular pellets and the polyester film are shown in Table 4.

TABLE 4

|  | | Polyester polymer | | | | | | Properties of film | | | |
|---|---|---|---|---|---|---|---|---|---|---|---|
|  | | | | Sb compound | | Color tone | | | After stretching | | |
|  | | | | | | | | | | Color | |
|  | Species of catalyst | $M_p/M_{Ti}$ | $M_{Ti} + M_p$ (mmol %) | $(Sb_2O_3)$ (mmol %) | IV | Value L | Value b | Haze before stretching (%) | IV | Value L | Value b | Thermal stability |
| Example 23 | TT-6 | 5.6 | 33 | — | 0.620 | 79.0 | 3.2 | 0.1 | 0.580 | 80.0 | 3.7 | 0.04 |
| Example 24 | TT-2 | 1.8 | 14 | — | 0.620 | 81.0 | 3.9 | 0.2 | 0.580 | 80.0 | 4.4 | 0.03 |
| Example 25 | TT-6 | 1.9 | 44 | — | 0.520 | 81.0 | 7.1 | 0.5 | 0.550 | 83.0 | 9.5 | 0.07 |
| Example 26 | TB solution + TP1 solution | 5.2 | 31 | — | 0.620 | 81.0 | 5.0 | 0.6 | 0.540 | 82.0 | 5.9 | 0.04 |

Example 27

A mixture of 100 parts by mass of dimethyl terephthalate and 70 parts by mass of ethylene glycol, and 0.009 parts by mass of tetra-n-butyl titanate were charged in a SUS vessel usable for a reaction under pressure and the resulting mixture was subjected to a transesterification reaction while heating it from 140° C. to 240° C. under a pressure of 0.07 MPa. Then, 0.031 parts by mass of mono-n-butyl phosphate was added to the reaction mixture, to thereby complete the transesterification reaction.

The reaction product was transferred to a polymerization vessel and then subjected to a polycondensation reaction heating it to 290° C. under high vacuum of 30 Pa or less to produce a polyester resin which had an intrinsic viscosity of 0.63 and contained diethylene glycol in a content of 1.3% by mass.

The resulting polyester resin was formed into chips by a melt granulator and then dried. The resulting dry chips were subjected to a melt spinning procedure to provide a undrawn filament yarn having a yarn count of 333 dtex/36 filament. Then, the undrawn filament yarn was drawn at a draw ratio of 4.0 to obtain a drawn multi-filament yarn having a yarn count of 83.25 dtex/36 filaments.

The measurement results are shown in Table 5.

Example 28

A polyester resin and polyester fibers were produced by the same procedures as in Example 27, except that the titanium compound was replaced by 0.016 parts by mass of titanium trimellitate synthesized in Production Example 5. The measurement results are shown in Table 5.

Examples 29 to 33 and Comparative Examples 17 to 22

In each of Examples 29 to 33 and Comparative Examples 17 to 22, a polyester resin and polyester fibers were produced by the same procedures as in Example 27, except that each of the compounds shown in Table 5 were used as a titanium compound or a phosphorous compound in each amount shown in Table 7. The measurement results are shown in Table 5.

Example 34

A polyester resin and polyester fibers were produced by the same procedures as in Example 27, except that the titanium compound and the phosphorus compound were replaced by the compounds shown in Table 7 which were used in the amounts shown in Table 5 and, after the completion of the transesterification reaction, 1.5 parts by mass of an ethylene glycol slurry of 20% by mass of titanium oxide was added. The measurement results are shown in Table 5.

Example 35

A polyester resin and polyester fibers were produced by the same procedures as in Example 27, except that, after the completion of the transesterification reaction, 0.02 parts by mass of pentaerythritol-tetrakis[3-(3,5-di-tert-butyl-4-hydroxyphenyl)propionate] (manufactured by Ciba Speciality Chemicals Inc. under the trademark of Irganox 1010) was added to the resulting reaction product. The measurement results are shown in Table 5.

Comparative Example 23

A mixture of 100 parts by mass of dimethyl terephthalate and 70 parts by mass of ethylene glycol, and 0.009 parts by mass of tetra-n-butyl titanate were charged in a SUS vessel usable for a reaction under pressure and the resulting mixture was subjected to a transesterification reaction while heating it from 140° C. to 240° C. under a pressure of 0.07 MPa. Then, 0.031 parts by mass of mono-n-butyl phosphate was added to the reaction mixture, to thereby complete the transesterification reaction.

After 0.053 parts by mass of diantimony trixoide was added to the reaction mixture, the mixture was transferred to a polymerization vessel and then subjected to a polycondensation reaction by heating to 290° C. under high vacuum of 30 Pa or less to provide a polyester which had an intrinsic viscosity of 0.63 and contained diethylene glycol in a content of 1.3% by mass. The resulting polyester resin was subjected to the same melt spinning and drawing procedures as in Example 27 to produce polyester filament yarn. The measurement results are shown in Table 5.

TABLE 5

| | Titanium compound | | Phosphorus compound | | Sb compound | | | Titanium | | |
|---|---|---|---|---|---|---|---|---|---|---|
| | Kind | Content (mmol %) | Kind | Content (mmol %) | $(Sb_2O_3)$ (mmol %) | $M_p/M_{Ti}$ | $M_{Ti} + M_p$ (mmol %) | oxide (% by mass) | Antioxidant (ppm) |
| Example 27 | TBT | 5 | NBP | 30 | — | 6 | 35 | — | — |
| Example 28 | TNT | 5 | NBP | 30 | — | 6 | 35 | — | — |
| Example 29 | TNT | 7 | NBP | 30 | — | 4.3 | 37 | — | — |
| Example 30 | TNT | 5 | NBP | 20 | — | 4 | 25 | — | — |
| Example 31 | TNT | 7 | NBP | 40 | — | 5.7 | 47 | — | — |
| Example 32 | TNT | 5 | PPA | 30 | — | 6 | 35 | — | — |
| Example 33 | TNT | 5 | THEP | 30 | — | 6 | 35 | — | — |
| Example 34 | TNT | 5 | NBP | 20 | — | 4 | 25 | 0.3 | — |
| Example 35 | TNT | 5 | NBP | 30 | — | 6 | 35 | — | 200 |
| Comparative Example 17 | TNT | 20 | NBP | 50 | — | 2.5 | 70 | — | — |
| Comparative Example 18 | TNT | 1.5 | NBP | 10 | — | 6.7 | 11.5 | — | — |
| Comparative Example 19 | TNT | 5 | NBP | 5 | — | 1 | 10 | — | — |
| Comparative Example 20 | TNT | 5 | NBP | 90 | — | 18 | 95 | — | — |
| Comparative Example 21 | TNT | 7 | NBP | 100 | — | 14.3 | 107 | — | — |
| Comparative Example 22 | TNT | 2 | NBP | 6 | — | 3.5 | 8 | — | — |
| Comparative Example 23 | TBT | 5 | NBP | 30 | 31 | 6 | 35 | — | — |

| | | | | Properties of yarn | | | | |
|---|---|---|---|---|---|---|---|---|
| | IV | DEG (% by mass) | Color tone L | Color tone b | Tensile strength (cN/dtex) | Intrinsic viscosity | Ultimate elongation (%) | Height of spinneret foreign matters (μm) |
| Example 27 | 0.63 | 1.3 | 80 | 3 | 3.8 | 0.611 | 28 | 2 |
| Example 28 | 0.63 | 1.3 | 79.5 | 2.8 | 3.8 | 0.612 | 27 | 1 |
| Example 29 | 0.63 | 1.4 | 79 | 3 | 3.7 | 0.61 | 28 | 2 |
| Example 30 | 0.63 | 1.3 | 79.5 | 2.3 | 3.6 | 0.613 | 27 | 1 |
| Example 31 | 0.63 | 1.4 | 79 | 3.3 | 3.7 | 0.608 | 26 | 3 |
| Example 32 | 0.63 | 1.3 | 80 | 4 | 3.8 | 0.611 | 29 | 2 |

TABLE 5-continued

| | | | | | | | | |
|---|---|---|---|---|---|---|---|---|
| Example33 | 0.63 | 1.3 | 79.5 | 4.5 | 3.7 | 0.612 | 27 | 2 |
| Example34 | 0.63 | 1.1 | 75 | 7.5 | 3.7 | 0.611 | 28 | 1 |
| Example35 | 0.63 | 1.3 | 80.2 | 2 | 3.8 | 0.62 | 26 | 3 |
| Comparative Example17 | 0.63 | 1.7 | 77 | 13 | 3.9 | 0.607 | 26 | 4 |
| Comparative Example18 | 0.45 | 0.9 | 82 | 1 | 3 | 0.44 | 22 | 1 |
| Comparative Example19 | 0.63 | 1.3 | 77 | 11 | 3.9 | 0.608 | 28 | 2 |
| Comparative Example20 | 0.51 | 1.3 | 81 | 1 | 3.2 | 0.498 | 22 | 2 |
| Comparative Example21 | 0.54 | 1.4 | 78 | 2 | 3.1 | 0.529 | 23 | 3 |
| Comparative Example22 | 0.52 | 0.9 | 80 | 2 | 3.2 | 0.505 | 22 | 1 |
| Comparative Example23 | 0.63 | 1.3 | 70 | 2.5 | 3.9 | 0.622 | 29 | 51 |

INDUSTRIAL APPLICABILITY

The process for producing a polyester resin of the present invention enables a polyester resin having good transparency, good color tone and high melt stability to be produced with high efficiency. All of the polyester resins, polyester fibers, polyester films and polyester bottle-formed articles of the present invention have good transparency and color tone and can be produced in practice with high efficiency.

What is claimed is:

1. A process for producing a poly(ethylene aromatic carboxylate ester) resin comprising polycondensing a diester of an aromatic dicarboxylic acid with ethylene glycol in the presence of a catalyst system, wherein the catalyst system comprises at least one member selected from the group consisting of:

non-reacted mixtures and reaction products of (1) a titanium compound component comprising at least one member selected from the group consisting of titanium alkoxides and reaction products of titanium alkoxides with aromatic polyvalent carboxylic acids or anhydrides thereof with (2a) a phosphorus compound component comprising at least one member selected from the compounds represented by the general formula (1):

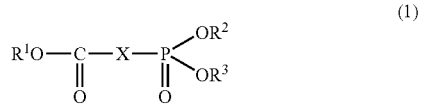

(1)

wherein $R^1$, $R^2$ and $R^3$ respectively and independently from each other represent an alkyl group having 1 to 4 carbon atoms and X represents a —$CH_2$— group or a group represented by the formula (1a):

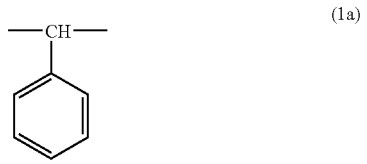

(1a)

the catalyst system satisfying the requirements (a), (b) and (c):

$$2 \leq M_{Ti} \leq 15 \qquad (a)$$

$$1 \leq (M_p/M_{Ti}) \leq 15 \qquad (b)$$

$$10 \leq (M_{Ti}+M_p) \leq 100 \qquad (c)$$

in which requirements (a), (b) and (c), $M_{Ti}$ represents a ratio of the amount in the units of milli moles of titanium element contained in the catalyst system to the total amount in the units of moles of the repeating ethylene aromatic dicarboxylate ester units in the poly(ethylene aromatic dicarboxylate ester), $M_p$ represents a ratio of the amount of phosphorus element in the units of milli moles contained in the catalyst system to the total amount in the units of moles of the repeating ethylene aromatic dicarboxylate ester units in the poly(ethylene aromatic dicarboxylate ester).

2. The process for producing a poly(ethylene aromatic dicarboxylate ester) resin as claimed in claim 1, further comprising producing the diester of the aromatic dicarboxylic acid with ethylene glycol by a diesterification reaction of the aromatic dicarboxylic acid with ethylene glycol.

3. The process for producing a poly(ethylene aromatic dicarboxylate ester) resin as claimed in claim 1, further comprising producing the diester of an aromatic dicarboxylic acid with ethylene glycol by a transesterification reaction of a dialkylester of an aromatic dicarboxylic acid with ethylene glycol.

4. The process for producing a poly(ethylene aromatic dicarboxylate ester) resin as claimed in claim 3, wherein the transesterification reaction of the dialkylester of the aromatic dicarboxylic acid with ethylene glycol is carried out in the presence of at least the non-reacted or reacted titanium compound component (1); and the resultant reaction mixture from the transesterification reaction and containing the diester of the aromatic dicarboxylic acid with ethylene glycol is subjected to a polycondensation reaction in the presence of a catalyst system comprising, together with at least the non-reacted or reacted titanium compound component (1) contained in the reaction mixture, the non-reacted or reacted phosphorus compound component (2a).

5. The process for producing a poly(ethylene aromatic dicarboxylate ester) resin as claimed in any one of claims 1 to 4, wherein the aromatic dicarboxylic acid is selected from terephthalic acid, isophthalic acid, naphthalene dicarboxylic acid, 5-sulphoisophthalate metal salt and 5-sulphoisophthalate onium salt.

6. The process for producing a poly(ethylene aromatic dicarboxylate ester) resin as claimed in claim 3 or 4, wherein the dialkylester of the aromatic dicarboxylic acid is selected from dimethyl terephthalate, dimethyl isophthalate dimethyl naphthalate, diethyl terephthalate, diethyl isophthalate and diethyl naphthalate.

7. The process for producing a poly(ethylene aromatic dicarboxylate ester) resin as claimed in claim 1, wherein the titanium alkoxides for the titanium compound component (1) are selected from the titanium compounds represented by the general formula (4):

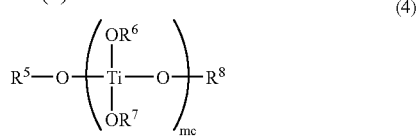

(4)

in which formula (4), $R^5$, $R^6$, $R^7$ and $R^8$ respectively and independently from each other represent an alkyl group having 2 to 10 carbon atoms or a phenyl group, and mc represents an integer of 1 to 4.

8. The process for producing a poly(ethylene aromatic dicarboxylate ester) resin as claimed in claim 1, wherein the aromatic polyvalent carboxylic acids for the titanium compound component (1) are selected from the compounds represented by the general formula (5):

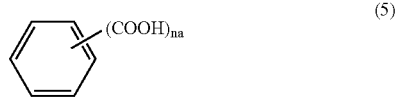

(5)

in which formula (5), na represents an integer of 2 to 4.

9. The process for producing a poly(ethylene aromatic dicarboxylate ester) resin as claimed in claim 3, wherein the transesterification reaction is carried out under a pressure of 0.05 to 0.20 MPa.

10. The process for producing a poly(ethylene aromatic dicarboxylate ester) resin as claimed in claim 3, wherein the dialkylester of the aromatic dicarboxylic acid to be subjected to the transesterification reaction comprises dimethyl terephthalate in an amount of 80 molar % or more based on the total molar amount of the dialkylester of the aromatic dicarboxylic acid.

11. The process for producing a poly(ethylene aromatic dicarboxylate ester) resin as claimed in claim 3, wherein the dialkylester of the aromatic dicarboxylic acid to be subjected to the transesterification reaction contains dialkyl terephthalate recovered by depolymerizing polyalkylene terephthalate in an amount of 70 molar % or more based on the total molar amount of the dialkylester of the aromatic dicarboxylic acid.

12. The process for producing a poly(ethylene aromatic dicarboxylate ester) resin as claimed in claim 11, wherein the recovered dialkyl terephthalate contains 2-hydroxyterephthalic acid in a content controlled to 2 ppm or less.

13. The process for producing a poly(ethylene aromatic dicarboxylate ester) resin as claimed in claim 4, wherein the catalyst system comprises a non-reacted mixture of the titanium compound component (1) with the phosphorus compound component (2a);
the whole amount of the titanium compound component (1) is added into the reaction system before or at the start of the transesterification; and
the whole amount of the phosphorus compound component (2a) is added into the resultant reaction system from the transesterification reaction before or at the start of the polycondensation reaction.

14. The process for producing a poly(ethylene aromatic dicarboxylate ester) resin as claimed in claim 4, wherein the catalyst system comprises a reaction product of the titanium compound component (1) with the phosphorus compound component (2a);
the whole amount of the catalyst system is added into the reaction system before or at the start of the transesterification reaction; and
after the transesterification reaction is completed, the resultant reaction mixture is subjected to the polycondensation reaction.

15. The process for producing a poly(ethylene aromatic dicarboxylate ester) resin as claimed in claim 4, wherein before the transesterification reaction, a portion of the titanium compound component (1), or a portion the reaction product of the titanium compound component (1) with the phosphorus compound component (2a) is added into the reaction system, and at least one stage during and after the completion of the transesterification reaction and before and during the polycondensation reaction, the remaining portion of the above-mentioned catalyst component is added into the reaction system.

16. The process for producing a poly(ethylene aromatic dicarboxylate ester) resin as claimed in claim 2, wherein the whole amount of the phosphorus compound component (2a) is added into the diesterification reaction system before the start of the diesterification reaction, or a portion of the phosphorus compound component (2a) is added into the diesterification reaction system before the start of the reaction, and the remaining portion of the phosphorus compound component (2a) is added, at least one stage during and after the completion of the diesterification reaction and before the start of and during the polycondensation reaction, into the reaction system.

17. A poly(ethylene aromatic dicarboxylate ester) resin produced by the process as claimed in claim 1 for producing a poly(ethylene aromatic dicarboxylate ester) resin.

18. The poly(ethylene aromatic dicarboxylate ester) resin as claimed in claim 17, further comprising an antioxidant hindered phenol compound in a content of 1% by mass or less.

19. The process for producing a poly(ethylene aromatic dicarboxylate ester) resin as claimed in claim 1, wherein poly(ethylene aromatic dicarboxylate ester) resin contains antimony element and germanium element each in a content controlled to 5/1000 molar % or less.

20. Polyester fibers comprising a poly(ethylene aromatic dicarboxylate ester) resin as claimed in claim 17.

21. The polyester fibers as claimed in claim 20, wherein the poly(ethylene aromatic dicarboxylate ester) resin comprises, as a principal component, polyethylene terephthalate.

22. A polyester film comprising a poly(ethylene aromatic dicarboxylate ester) resin as claimed in claim 17.

23. The polyester film as claimed in claim 22, wherein the poly(ethylene aromatic dicarboxylate ester) resin comprises, as a principal component, polyethylene terephthalate.

24. A bottle-formed polyester article comprising a poly(ethylene aromatic dicarboxylate aster) resin as claimed in claim 17.

25. The bottle-formed polyester article as claimed in claim 24, wherein the poly(ethylene aromatic dicarboxylate ester) resin comprises, as a principal component, polyethylene terephthalate.

* * * * *